Dec. 8, 1953  C. E. SLAUGHTER  2,661,790
MACHINE FOR MAKING TUBULAR CONTAINERS
Filed Sept. 4, 1947  17 Sheets-Sheet 1

INVENTOR
CHARLES E. SLAUGHTER
BY
Sol Shappirio
ATTORNEY

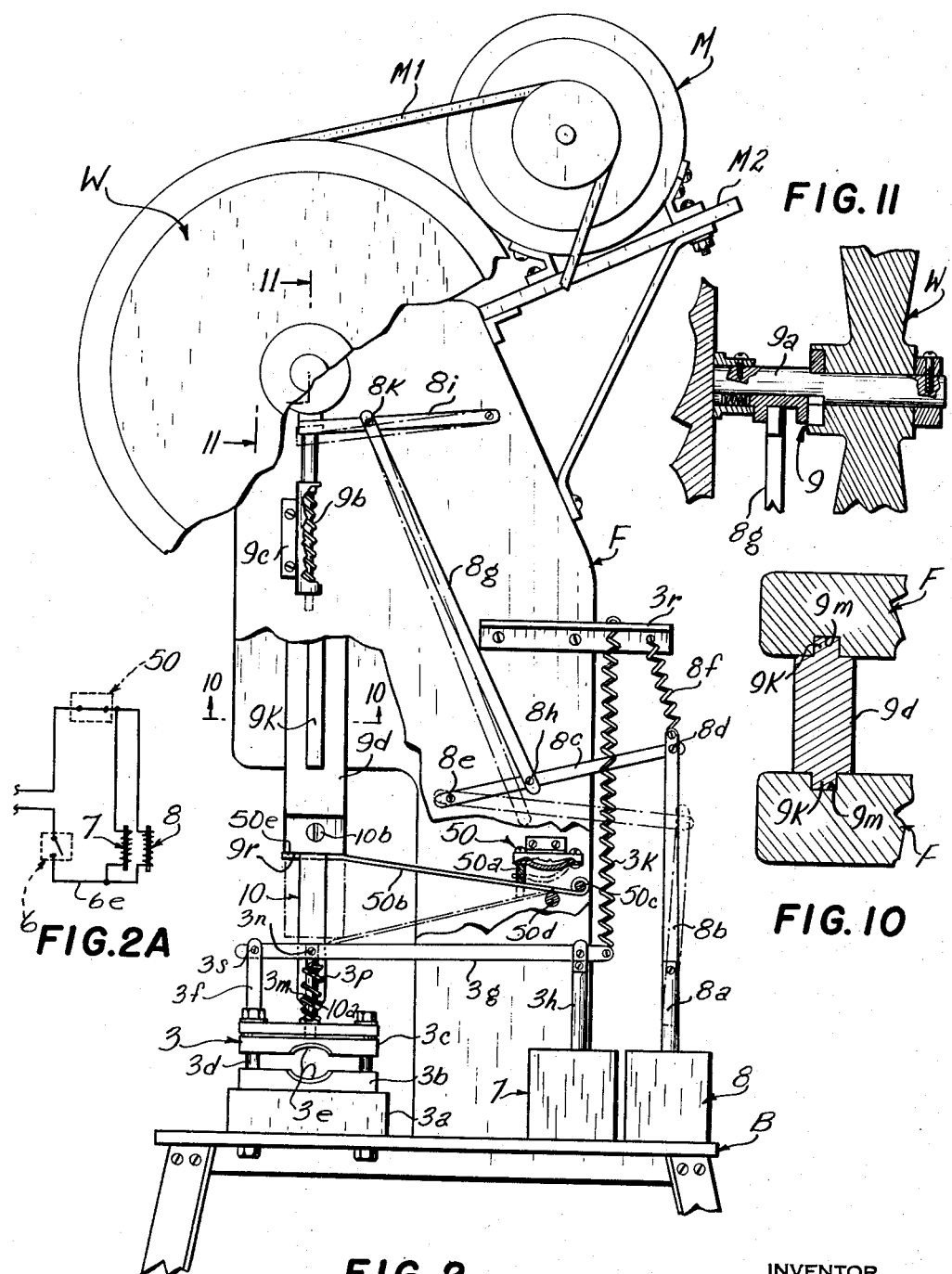

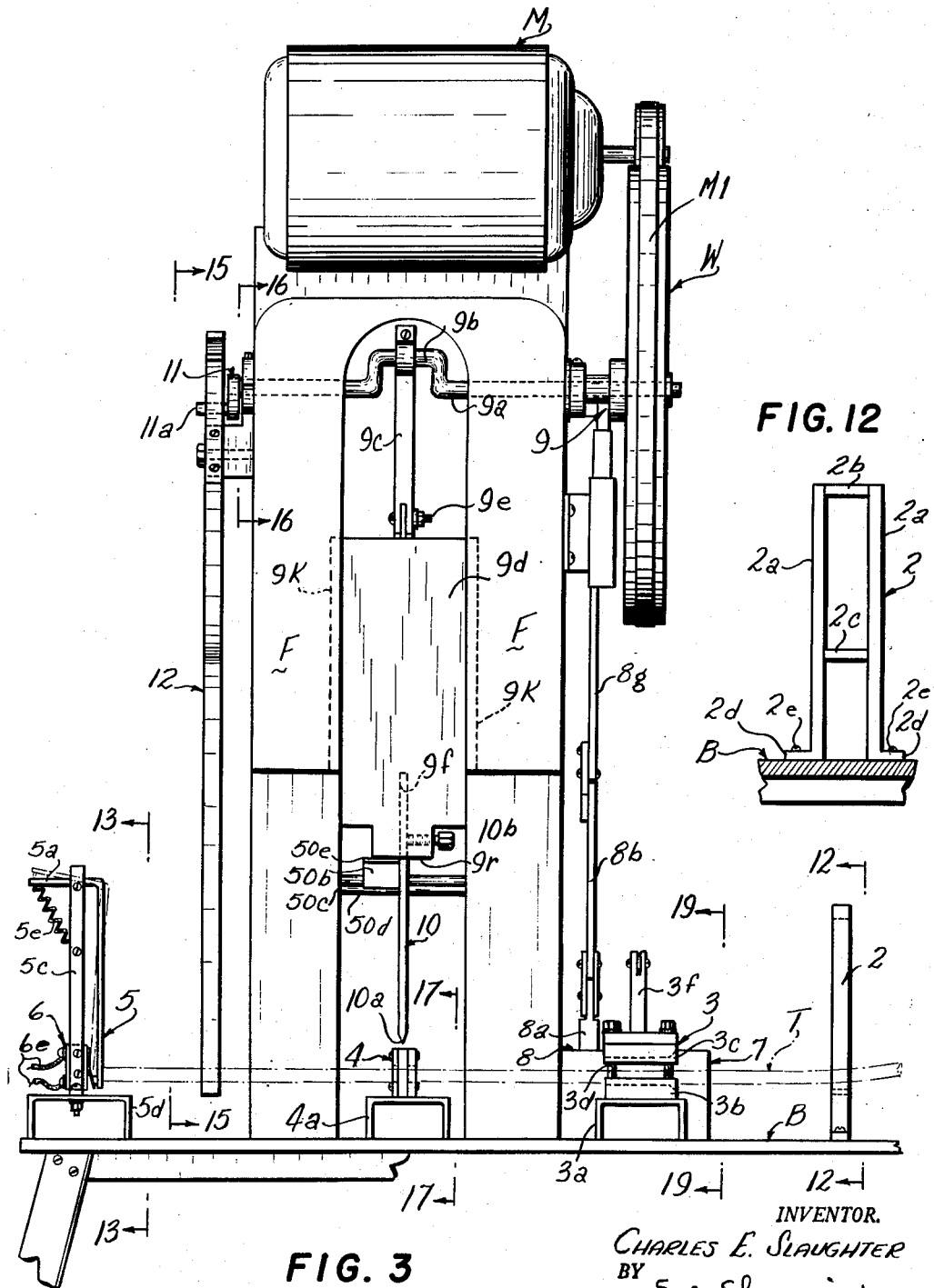

Dec. 8, 1953     C. E. SLAUGHTER     2,661,790
MACHINE FOR MAKING TUBULAR CONTAINERS
Filed Sept. 4, 1947     17 Sheets-Sheet 4
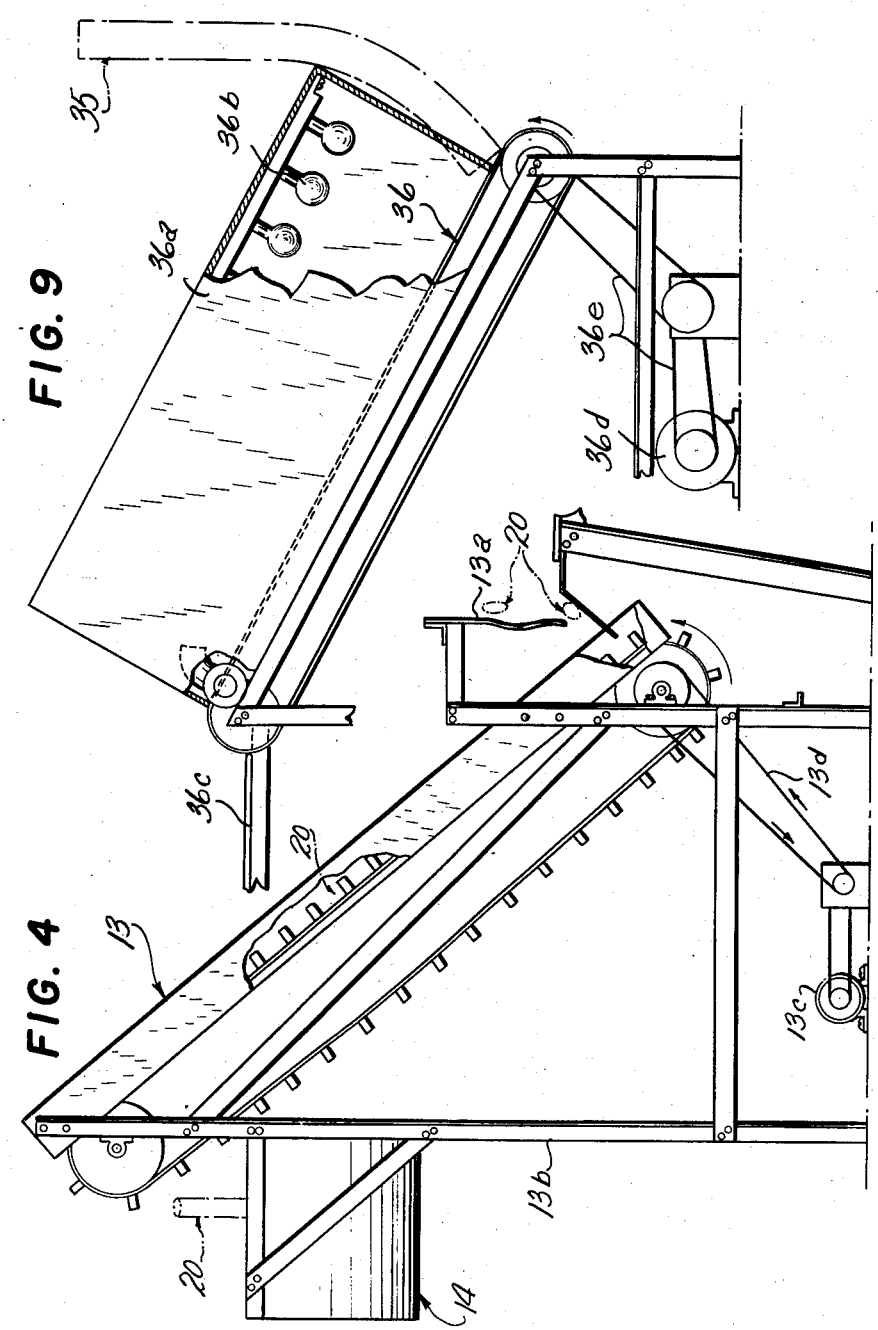
INVENTOR
CHARLES E. SLAUGHTER
BY
Sol Shappirio
ATTORNEY

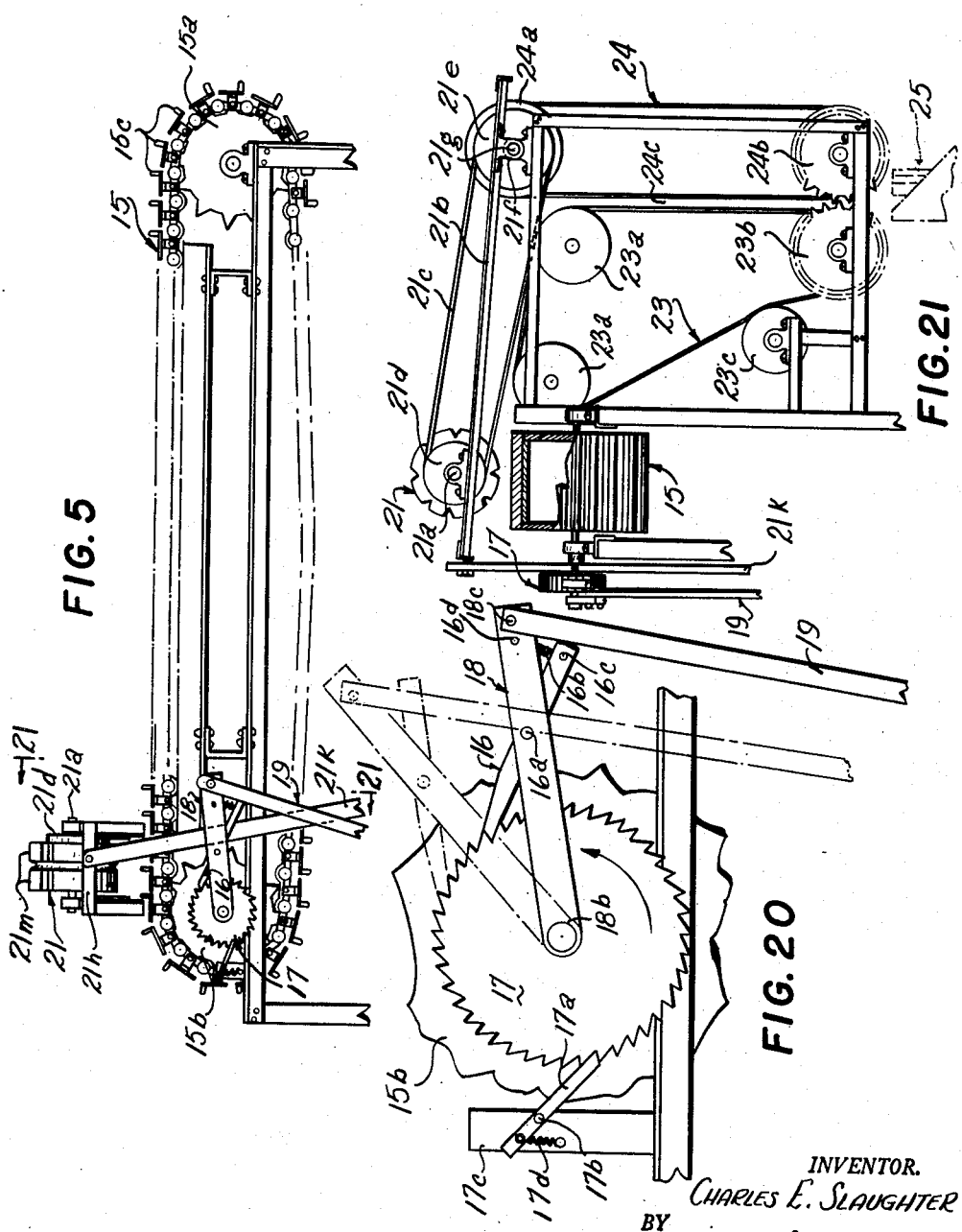

Dec. 8, 1953 C. E. SLAUGHTER 2,661,790
MACHINE FOR MAKING TUBULAR CONTAINERS
Filed Sept. 4, 1947 17 Sheets-Sheet 6
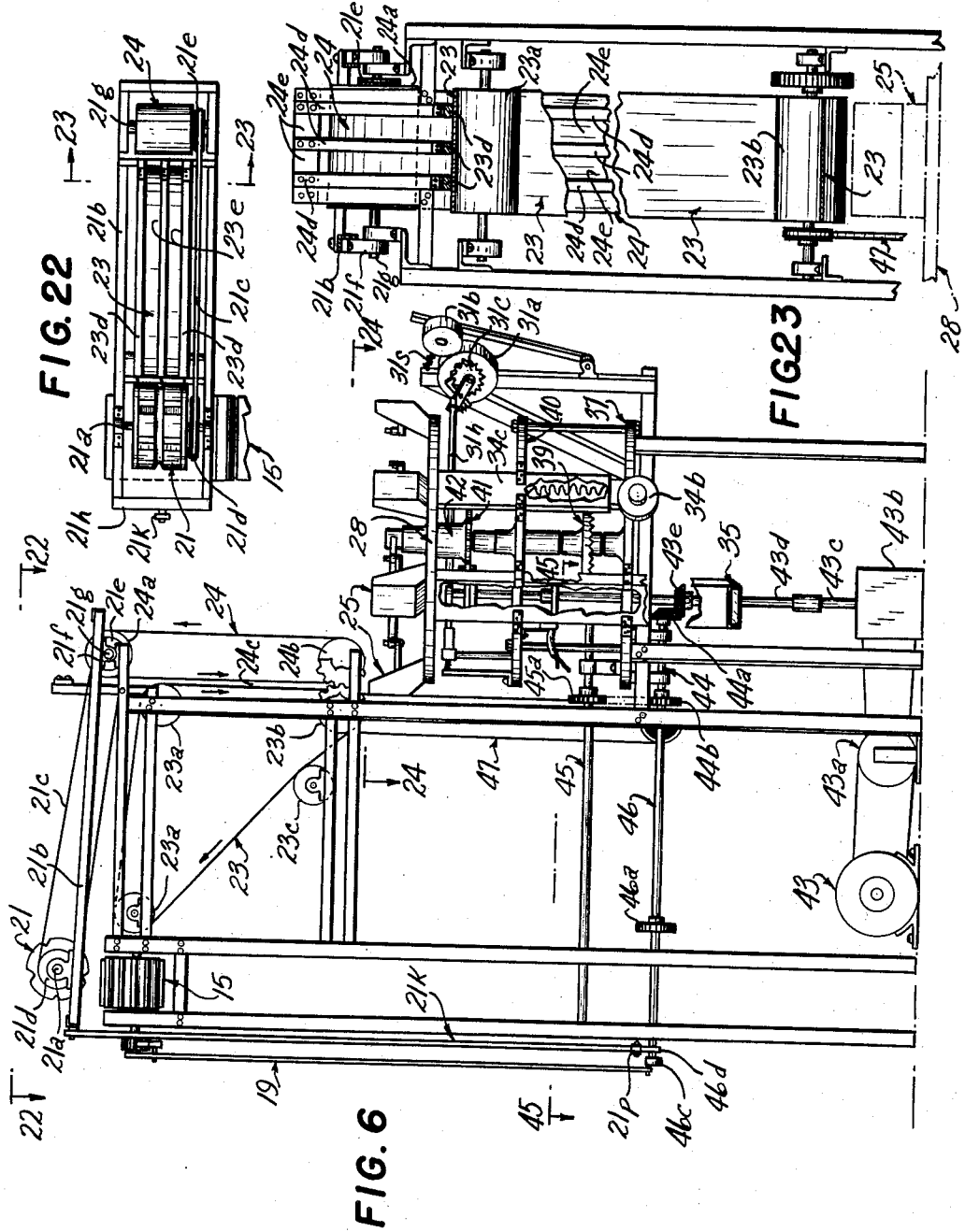
INVENTOR.
CHARLES E. SLAUGHTER
BY
Sol Shappirio
ATTORNEY.

Dec. 8, 1953     C. E. SLAUGHTER     2,661,790
MACHINE FOR MAKING TUBULAR CONTAINERS
Filed Sept. 4, 1947     17 Sheets-Sheet 8
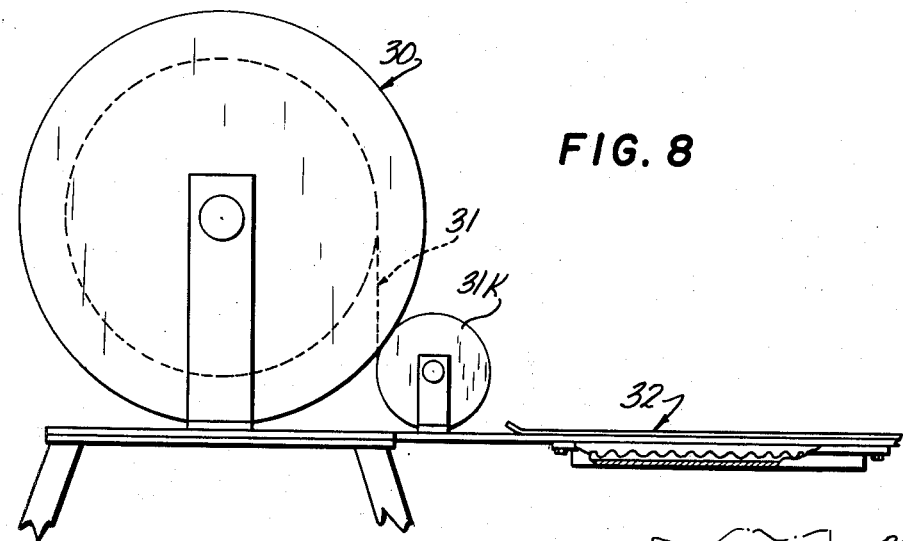
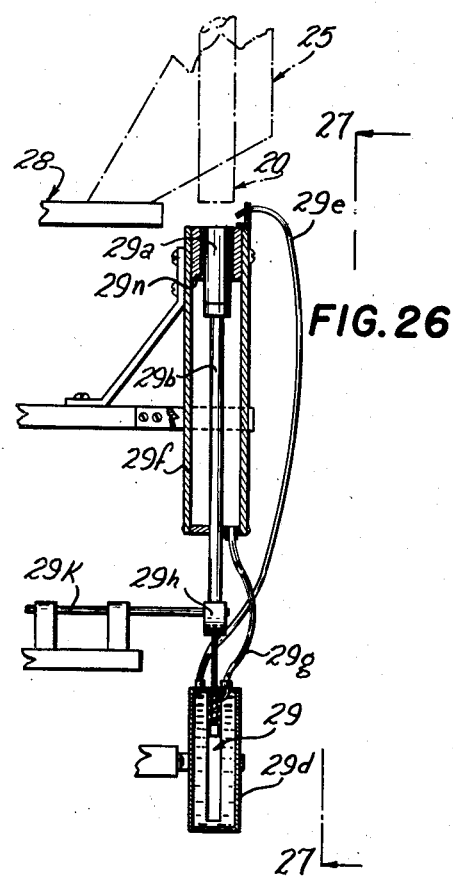
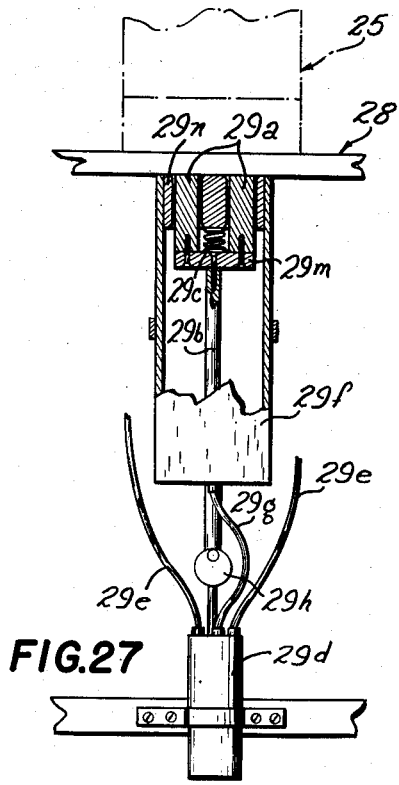
INVENTOR.
CHARLES E. SLAUGHTER
BY
Sol Shapiro
ATTORNEY.

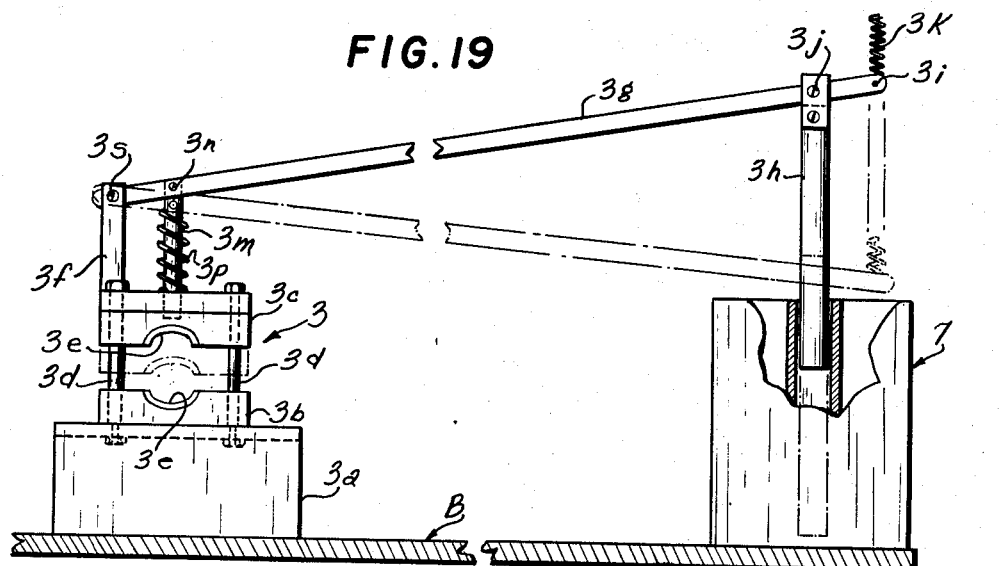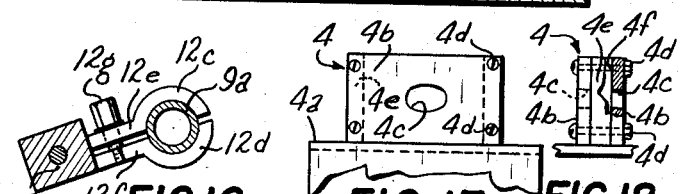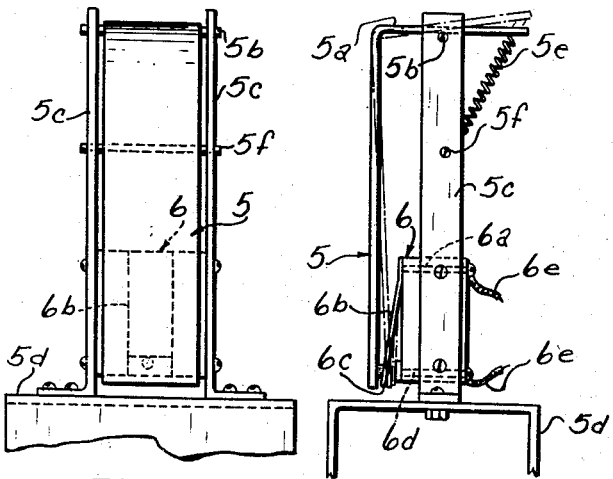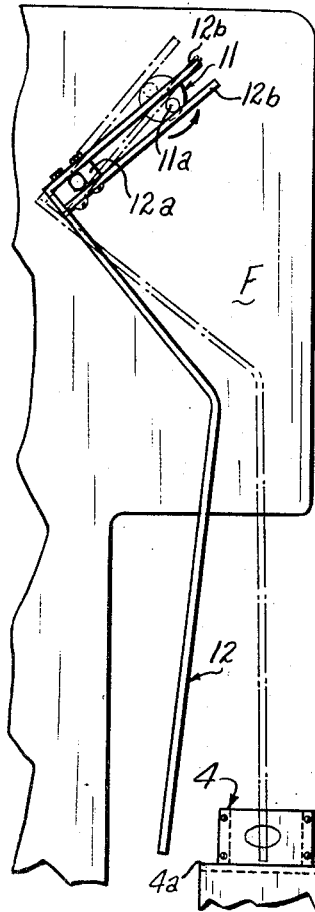

Dec. 8, 1953           C. E. SLAUGHTER           2,661,790
MACHINE FOR MAKING TUBULAR CONTAINERS
Filed Sept. 4, 1947           17 Sheets-Sheet 10
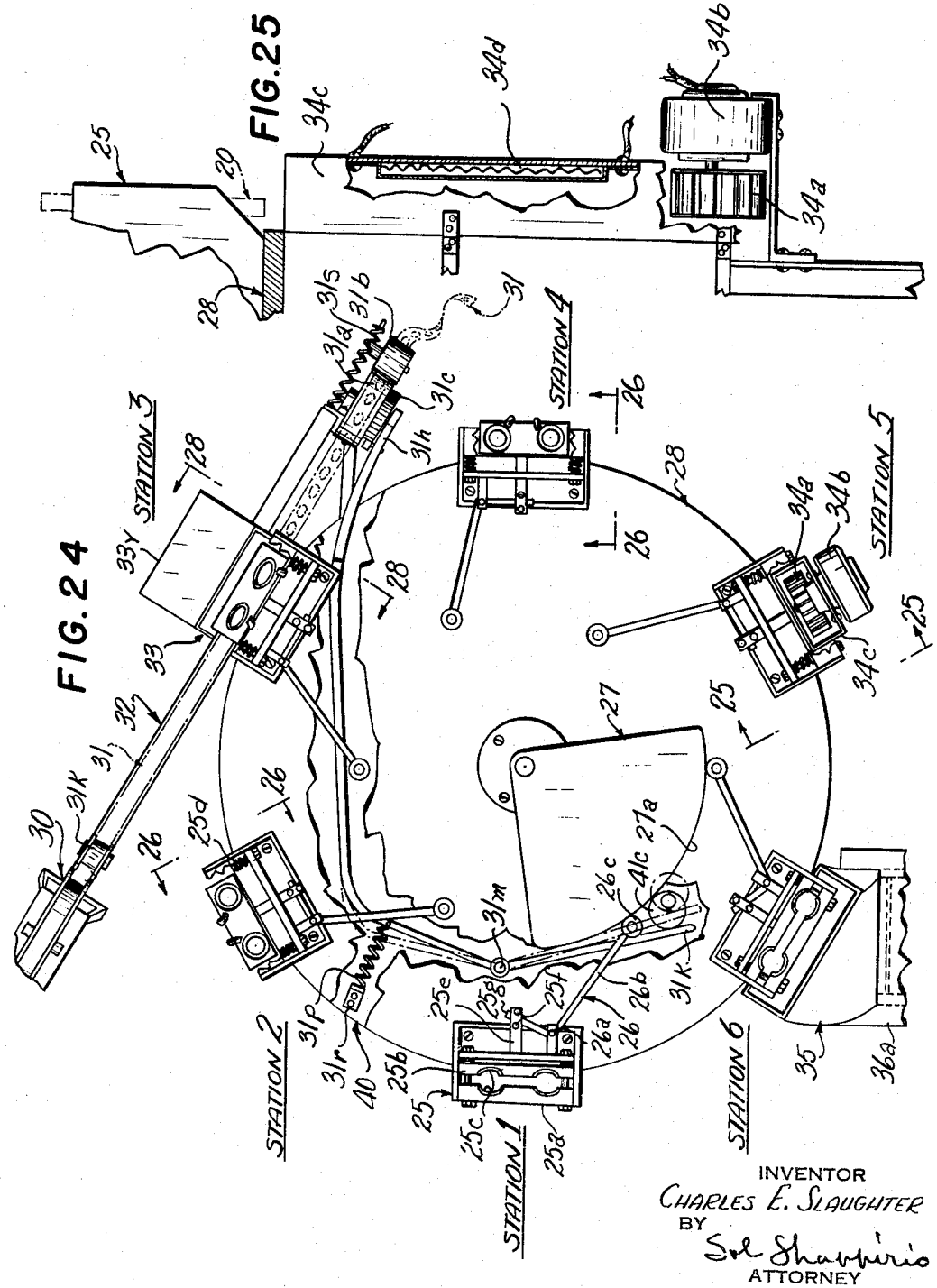
INVENTOR
CHARLES E. SLAUGHTER
BY
Sol Shapiro
ATTORNEY Dec. 8, 1953   C. E. SLAUGHTER   2,661,790
MACHINE FOR MAKING TUBULAR CONTAINERS
Filed Sept. 4, 1947   17 Sheets-Sheet 11
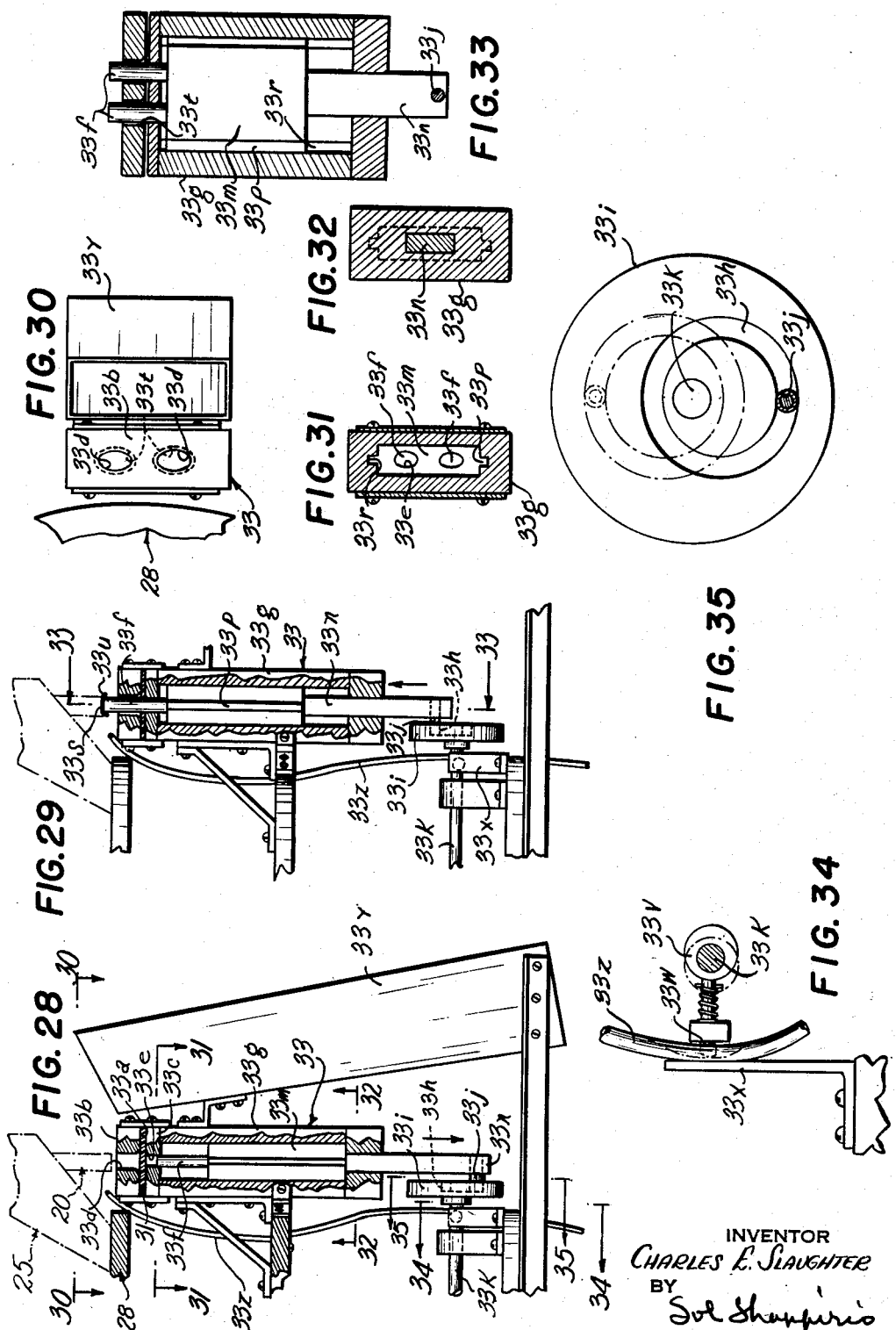
INVENTOR
CHARLES E. SLAUGHTER
BY
Sol Shapiro
ATTORNEY Dec. 8, 1953     C. E. SLAUGHTER     2,661,790
MACHINE FOR MAKING TUBULAR CONTAINERS
Filed Sept. 4, 1947     17 Sheets-Sheet 12
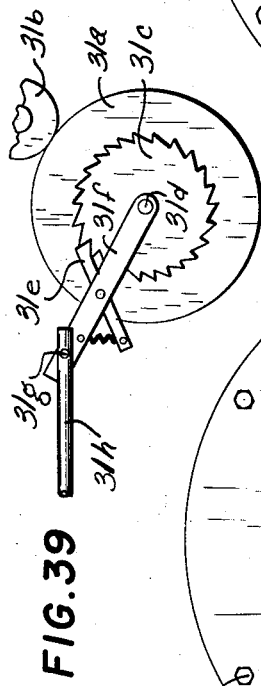
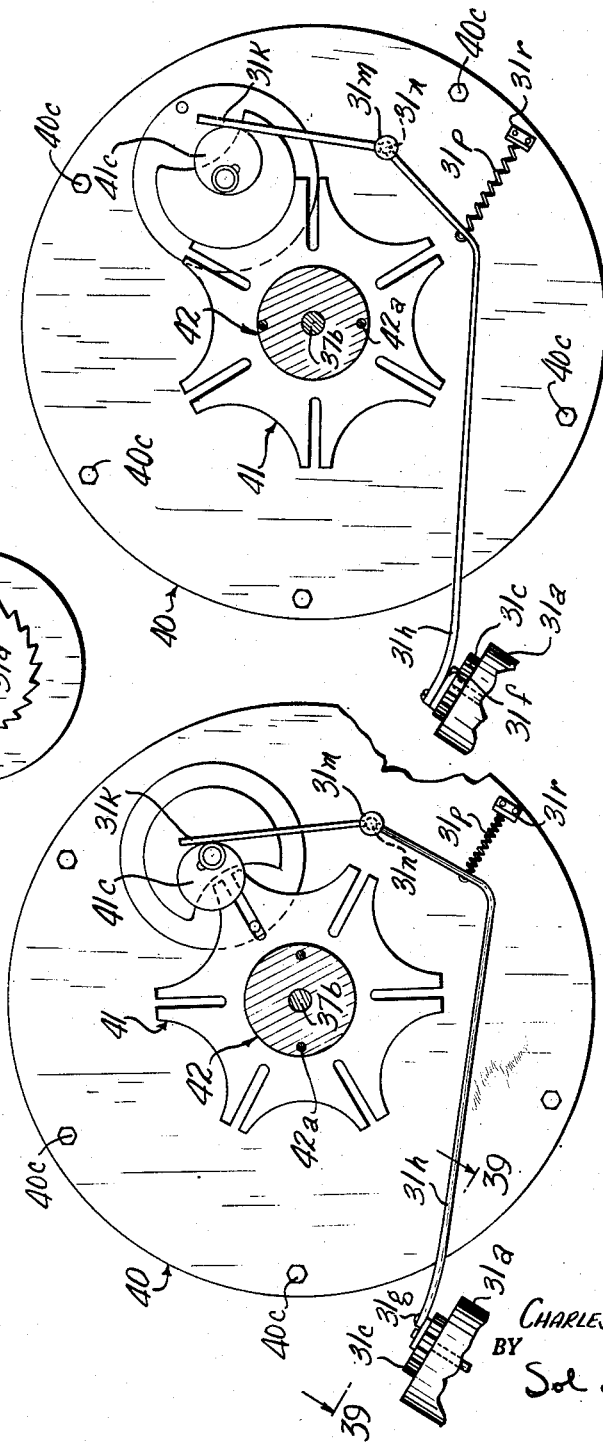
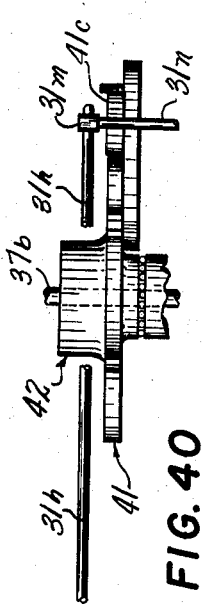
INVENTOR.
*Charles E. Slaughter*
BY *Sol Shapiro*
ATTORNEY.

Dec. 8, 1953   C. E. SLAUGHTER   2,661,790
MACHINE FOR MAKING TUBULAR CONTAINERS
Filed Sept. 4, 1947                                    17 Sheets-Sheet 13
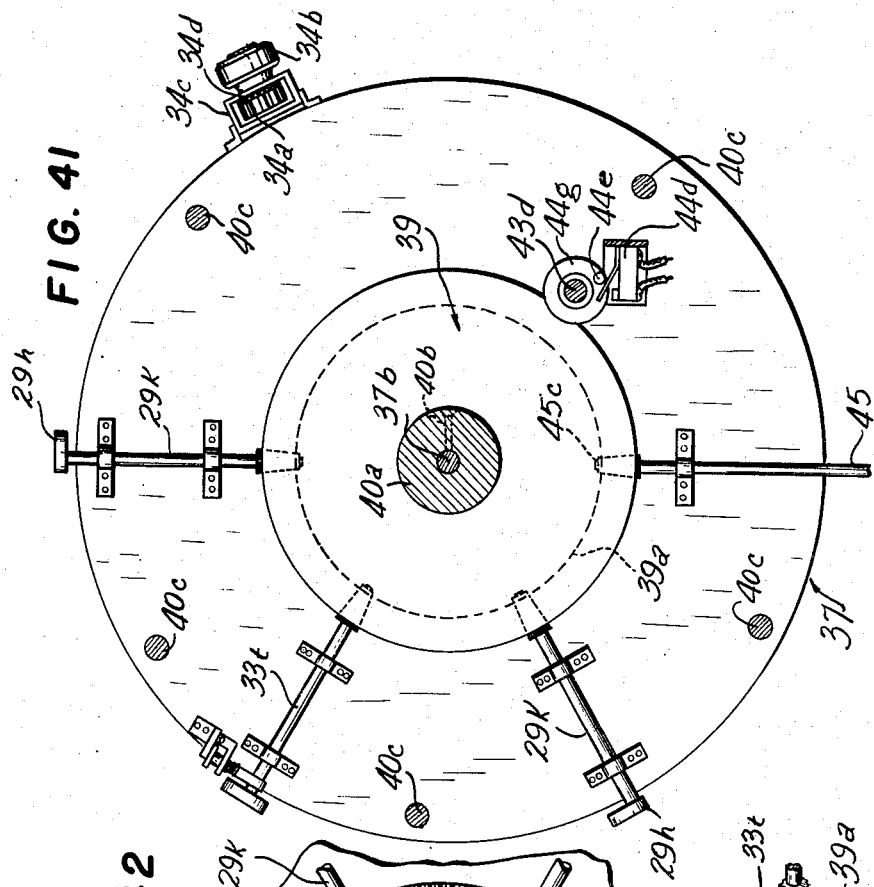
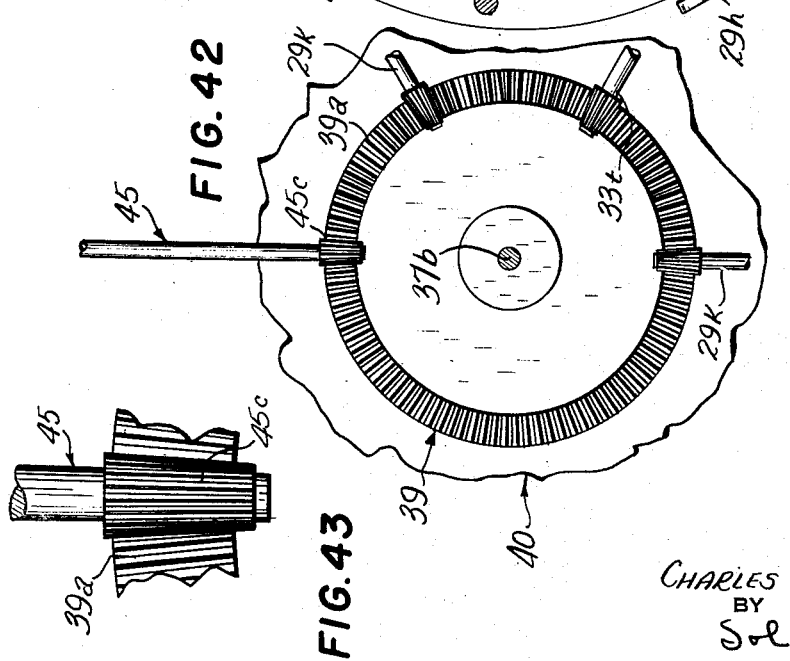
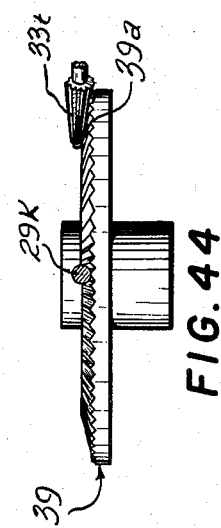
INVENTOR
Charles E. Slaughter
BY
Sol Shappirio
ATTORNEY

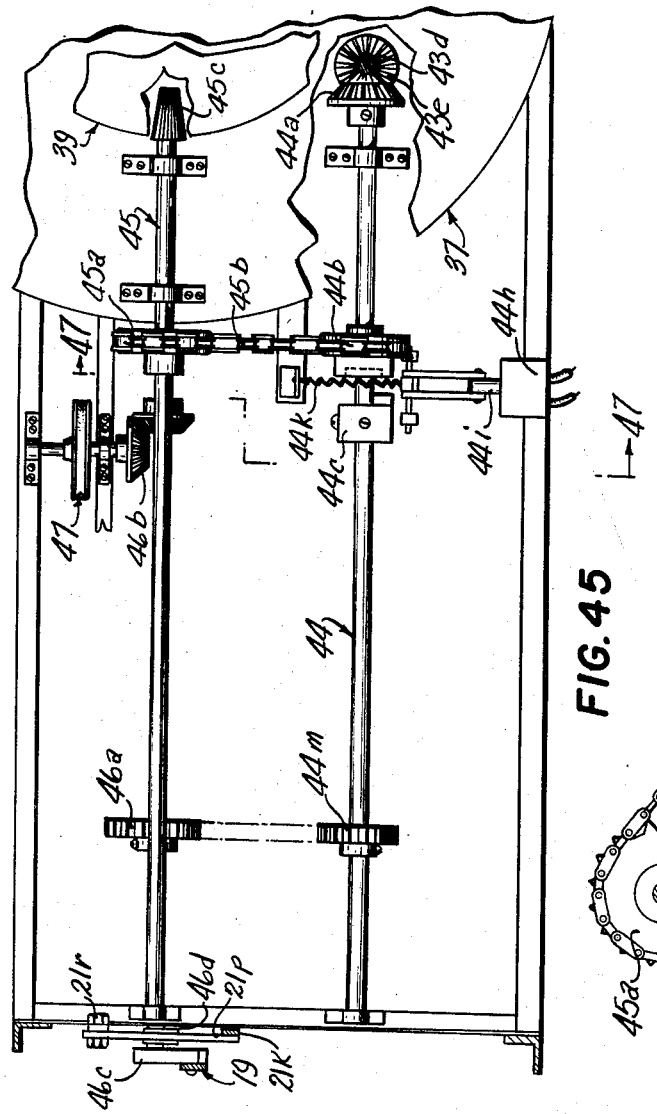

Dec. 8, 1953     C. E. SLAUGHTER     2,661,790
MACHINE FOR MAKING TUBULAR CONTAINERS
Filed Sept. 4, 1947     17 Sheets-Sheet 15
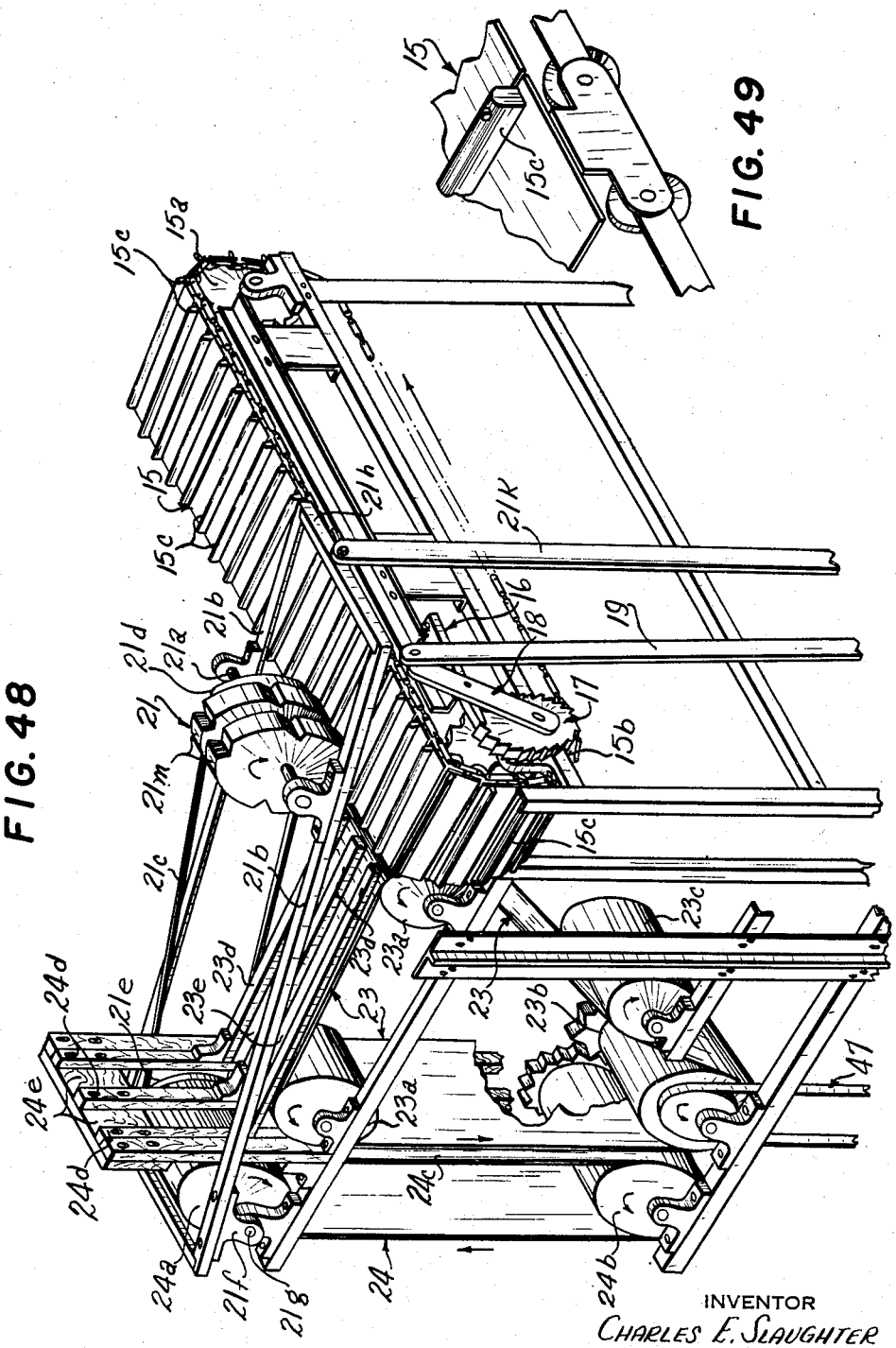
INVENTOR
CHARLES E. SLAUGHTER
BY
Sol Shappirio
ATTORNEY Dec. 8, 1953

C. E. SLAUGHTER 2,661,790

MACHINE FOR MAKING TUBULAR CONTAINERS

Filed Sept. 4, 1947

INVENTOR.
CHARLES E. SLAUGHTER
BY
Sol Shappirio
ATTORNEY.

Dec. 8, 1953     C. E. SLAUGHTER     2,661,790
MACHINE FOR MAKING TUBULAR CONTAINERS
Filed Sept. 4, 1947     17 Sheets-Sheet 17
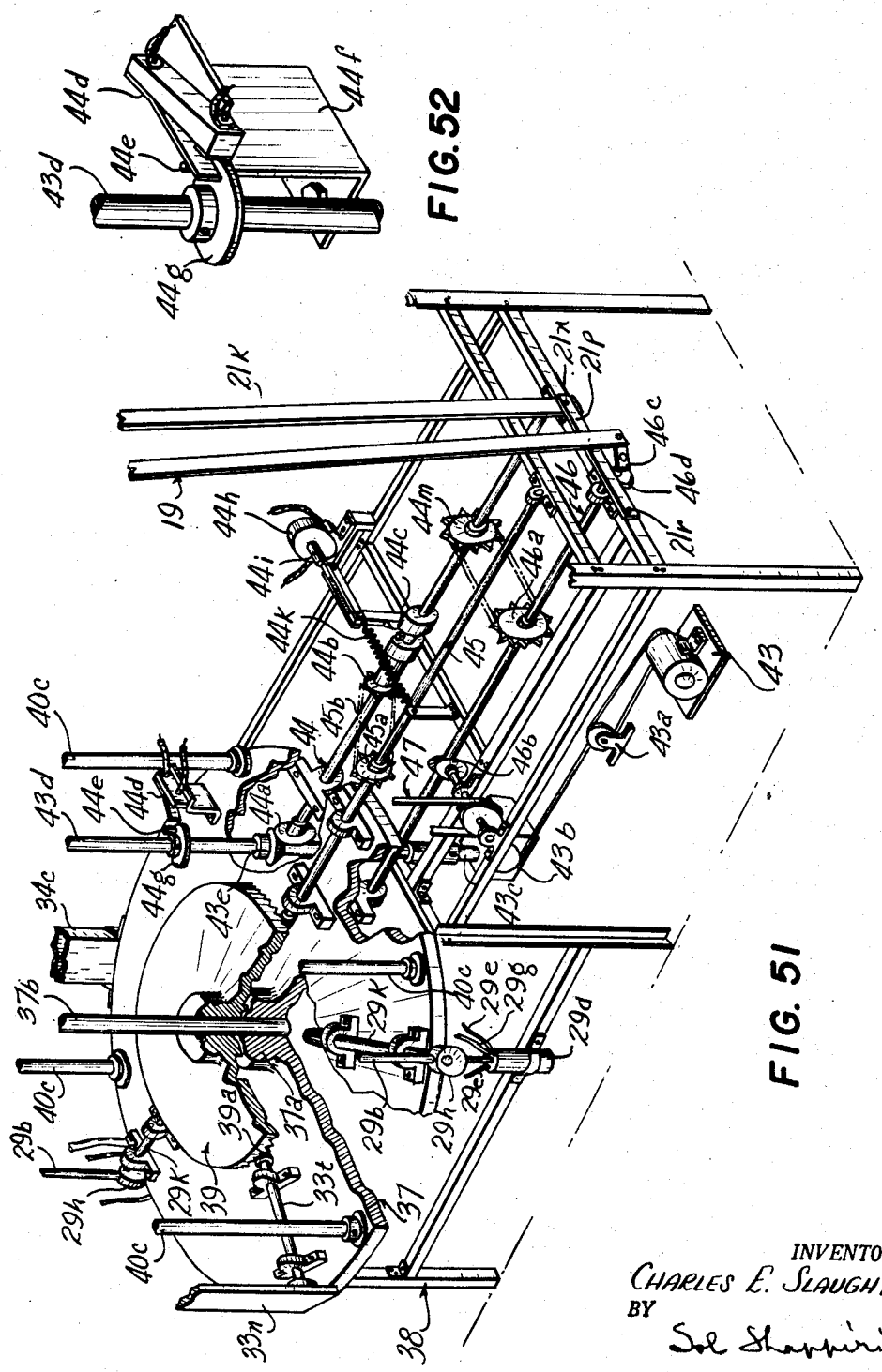
INVENTOR.
CHARLES E. SLAUGHTER
BY
Sol Shapiro
ATTORNEY.

Patented Dec. 8, 1953

2,661,790

UNITED STATES PATENT OFFICE 2,661,790

MACHINE FOR MAKING TUBULAR CONTAINERS

Charles E. Slaughter, New Canaan, Conn., assignor to Extruded Plastics, Inc., a corporation of Connecticut Application September 4, 1947, Serial No. 772,095

12 Claims. (Cl. 154—1)

This invention relates to methods and machines for making tubular containers and particularly for the production of containers from tubes or tubing specifically plastic tubes or tubing.

Prior art methods of producing containers from plastic materials have not been able to compete successfully in many fields, despite the evident disadvantages of glass due to its fragile nature, because of several reasons. Among those reasons one has been cost of manufacture resulting from the requirement of manual operations at many stages of the procedure. Another reason has been because those manual operations do not produce finished containers of good workmanship-like character. The closures in such containers do not fit properly, solvents and cements applied for sealing the closures in position mar the surfaces of the plastic and a satisfactory appearing article is not produced as a routine matter of production, there being many rejects.

Among the objects of the present invention is the production of containers from plastics in which continuous operations are carried out resulting in the economical production of containers in great numbers on large scale operations.

Further objects include continuous automatic operations resulting in high rates of production of plastic containers.

Still further objects include the production of such containers from plastics eliminating any manual operations whatsoever.

Still further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In connection with that more detailed description, there is shown in the accompanying drawings, the following:

Figure 2 is a side elevation on line 2—2 of Figure 1 showing the vise operating and knife operating mechanisms;

Figure 2A is a detail showing the circuit utilized in controlling the tube locking vise and the shearing means;

Figure 3 is an elevation on line 3—3 of Figure 1 showing the mechanism for shearing tube lengths from the continuous tubing;

Figure 4 is a side elevation on line 4—4 of Figure 1 showing the conveyor for delivering the sheared tubes to the storage hopper;

Figure 5 is a side elevation on line 5—5 of Figure 1 showing the conveyor for delivering sheared tubes from the storage hopper to the automatic tube feeding mechanism;

Figure 6 is a side elevation on line 6—6 of Figure 1 showing the sealing machine and related mechanism;

Figure 8 is a side elevation partly in section on line 8—8 of Figure 1 showing the means for feeding tape from which caps or closures are punched;

Figure 9 is a side elevation on line 9—9 of Figure 1 showing the conveyor means for removing the finished tubes having sealed closures to storage;

Figure 10 is a fragmentary sectional detail on line 10—10 of Figure 2;

Figure 11 is a fragmentary sectional detail on line 11—11 of Figure 2;

Figure 12 is a fragmentary detail on line 12—12 of Figure 3; showing the guide for the continuous tubing;

Figure 13 is a detail on line 13—13 of Figure 3 showing the switch mechanism for operating the solenoids that control the vise for locking the tubing and the shearing means;

Figure 14 is a side elevation of Figure 13;

Figure 15 is a side elevation on line 15—15 of Figure 3 showing the knockout mechanism for the sheared tubes;

Figure 16 is a fragmentary detail on line 16—16 of Figure 3 of the provision for adjustment of the knockout means;

Figure 17 is a fragmentary detail on line 17—17 of Figure 3 showing an elevation of the cutter block;

Figure 18 is a side view of Figure 17;

Figure 19 is a side elevation on line 19—19 of Figure 3 showing the means for operating the vise to lock the tubing during the shearing operation;

Figure 20 is a fragmentary detail showing the means for controlling movement of the belt conveyor 15;

Figure 21 is a side elevation on line 21—21 of Figure 5 showing the mechanism for removing tubes from the conveyor and delivering them by belts to a chuck at the first station of the sealing machine;

Figure 22 is a top plan view of Figure 21;

Figure 23 is a side elevation on line 23—23 of Figure 22 showing the means for delivering the tubes into the chuck at the first station of the sealing machine;

Figure 24 is a plan view on line 24—24 of Figure 6 with parts broken away showing the various stations in the sealing mechanism;

Figure 25 is a detail partly broken away on line 25—25 of Figure 24 showing the blower and heater utilized at station 5 of the sealing mechanism;

Figure 26 is a side elevation partly in section on line 26—26 of Figure 24 showing the means for delivering solvent to the tubes during the sealing operation;

Figure 27 is a detail partly in section on line 27—27 of Figure 26;

Figure 28 is a side elevation partly in section on line 28—28 of Figure 24 showing the punching mechanism for punching out caps or closures and placing them tentatively in the tubes;

Figure 29 is a view similar to Figure 28 showing the position of the punch means after a closure has been punched out and is positioned in the tube;

Figure 30 is a fragmentary detail on line 30—30 of Figure 28;

Figure 31 is a fragmentary detail in section on line 31—31 of Figure 28;

Figure 32 is a fragmentary detail in section on line 32—32 of Figure 28;

Figure 33 is a central section on line 33—33 of Figure 29 through the punch mechanism;

Figure 34 is a fragmentary detail of means for controlling the flow of air in the blower on line 34—34 of Figure 28;

Figure 35 is a detail on line 35—35 of Figure 28;

Figure 37 is a fragmentary detail on line 37—37 of Figure 7 showing the means for correlating the feeding of tape to the closure punching mechanism with the movement of the tubes through the several stations in the sealing mechanism;

Figure 38 is a view similar to that of Figure 37 showing the parts in a different position;

Figure 39 is a fragmentary detail on line 39—39 of Figure 37 showing the ratchet mechanism for drawing the plastic tape through the punch press for producing closures;

Figure 40 is a detail showing a side elevation of the parts in Figure 37;

Figure 41 is a detail on line 41—41 of Figure 7 showing the means for transmitting power to the various stations of the sealing mechanism;

Figure 42 is a fragmentary plan view on line 42—42 of Figure 7 also showing details of the method of transmitting power to the stations of the sealing mechanism;

Figure 43 is a fragmentary detail enlarged, of elements of Figure 42;

Figure 44 is a side view of Figure 42;

Figure 45 is a plan view on line 45—45 of Figure 6 showing elements by which power is transmitted to various portions of the mechanism;

Figure 46 is an end view of Figure 47;

Figure 47 is a fragmentary detail on line 47—47 of Figure 45 showing the clutch control in connection with certain power transmitting mechanism;

Figure 48 is a perspective view showing the operating mechanism and relation between the belt for conveying tubes from the hopper to the first chuck of the sealing mechanism and the power connections therefor;

Figure 49 is a fragmentary detail of the structure of the conveyor belt shown in Figure 48;

Figure 51 is a perspective view partly in section showing the general means for supplying power to the sealing mechanism;

Figure 52 is a fragmentary detail of the switch control for operating the clutch in connection with power transmission to one of the elements.

Figure 1:
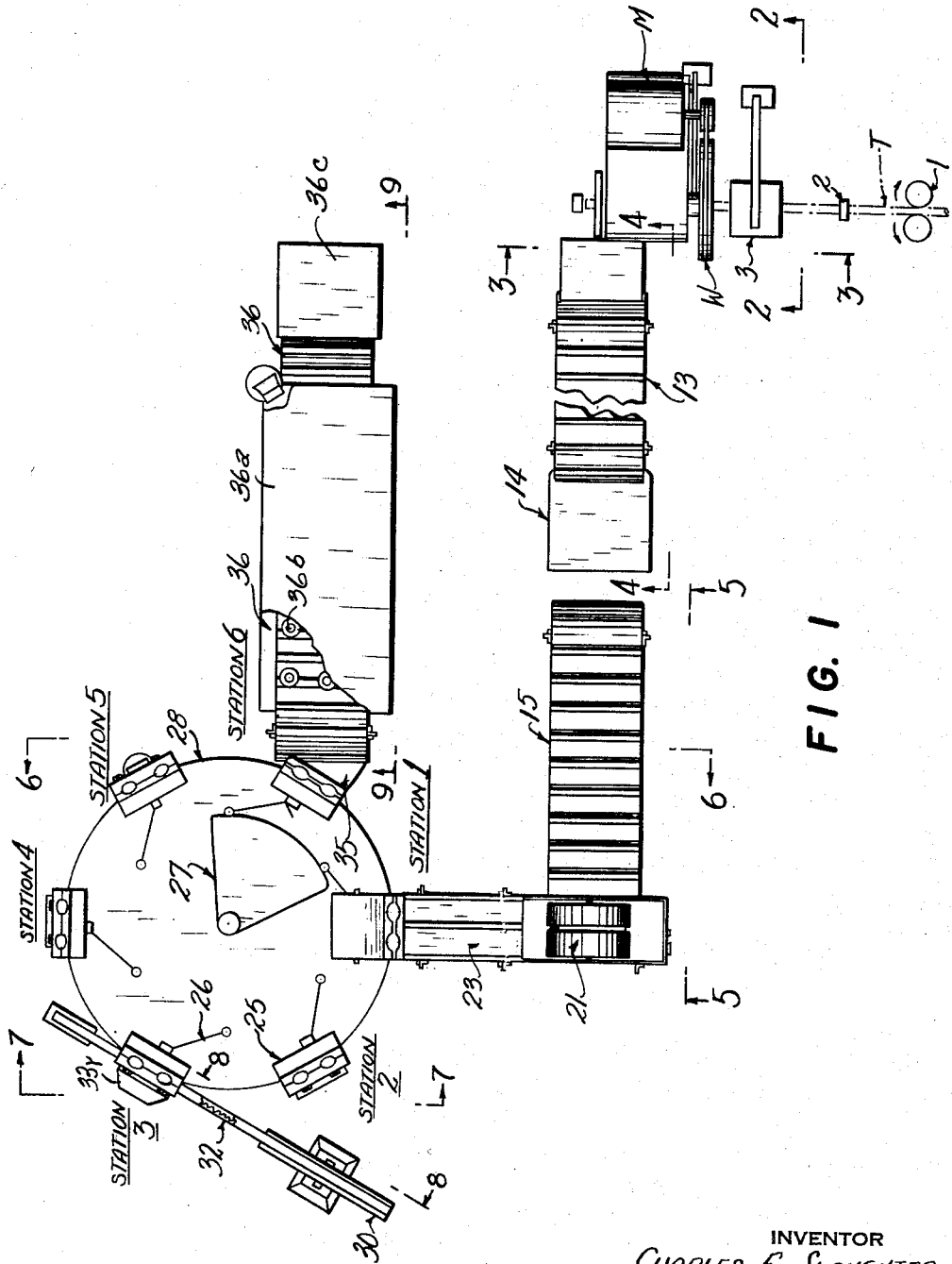
Figure 1 is a top plan diagrammatic view of all of the associated mechanism showing the general layout.

In accordance with the present invention tubular containers are produced from plastic tubing and tubes although the invention is applicable to the production of containers from various other materials including metals, in at least many of the operations set forth below. The invention will be illustrated particularly in connection with the production of containers from plastics and more particularly from thermoplastic materials.

In accordance with the invention tubular containers are manufactured continuously preferably starting with continuous tubing made on an extrusion machine from thermoplastic material. Such tubing as it is being continuously extruded and after it has reached rigidity is subjected to a shearing operation to cut off from such continuous tubing, tubes of a length for the particular container to be manufactured. The shearing operations for producing the tube lengths from the continuous tubing, are carried out continuously so that the tubes for producing the containers are constantly supplied from such shearing operation.

Instead of producing the tubes by shearing operations in this way, the tubes for the manufacture of the containers may be obtained from any other source. As noted above, where the tubes for the containers are produced from extruded stock they will in general be made from a thermoplastic material. Any of the thermoplastic materials utilized in producing extruded tubular stock may be employed for these purposes, and particularly synthetic resinous material may be used including for example, cellulose derivatives such as the esters and ethers, particularly cellulose acetate, cellulose nitrate, cellulose acetate butyrate, ethyl cellulose, benzyl cellulose, etc.; vinyl polymers and copolymers including polymerized vinyl acetate, polymerized vinylidene chloride, and copolymers of vinyl chloride and vinyl acetate; polymerized styrene; methacrylate and methyl methacrylate resins; acrylate and ethyl acrylate resins; polyethylenes; nylon type resins; etc. Where the tubes are made from plastic stock which is not extruded, the materials may be of the character set forth above or any of the thermosetting resins used for making tubular stock may be employed. And as pointed out above, for some purposes many of the operations herein set forth may be carried out on tubes made from other than plastics such as metal, paper or cardboard, etc.

The cross-sectional contour of the tubing or tubes employed may be varied as desired and may take any configuration such as circular, oval, square, hexagonal, or otherwise polygonal, etc., and containers may be produced from any stock of any configuration desired. The plastic materials lend themselves to the use of color and colored stock of any desired character may be employed whether dyed, pigmented, striated, etc.

The tubes thus obtained in any desired way as set forth above, are continuously conveyed to what may be called the sealing station where the tubes continuously pass through a series of stations at which the operations for introducing the closure and sealing the closure in position are carried out. The tubes may be conveyed from the conveyor to the sealing station either as individual tubes operated on successively in such sealing station, or a group of tubes such as two or more tubes may be simultaneously fed side by side to the sealing station and the sealing operation carried on such group of tubes simultaneously. Operations in this way increase the capacity and rate of production of containers. Desirably the conveyor movement is synchronized with the movement of the tubes through the sealing station to make for automatic operation in which the tube or tubes are continuously fed to and through the sealing station where the sealing operations are carried out.

It is an important feature of the present invention that the closures for the tubular containers are desirably manufactured at the sealing station immediately prior to their use, that is, immediately prior to the insertion of the closures into the tubes to produce the containers. The manufacture of the closures in this way immediately prior to their utilization, particularly carried out by automatic means, greatly increases the capacity of the devices, avoids the necessity for handling individual closures from hoppers, and eliminates many manual operations otherwise required. After insertion of the desired closures into the tubes to produce the containers, application of solvents or cement may be made followed by drying operations resulting in the continuous production of containers at very high rates of production by automatic means eliminating manual operations and resulting in finished articles that are produced in practically perfect condition by routine methods of procedure despite the very high rates of production which are possible in accordance with the present invention.

Many features of the operation including both steps employed and the machinery involved will appear from the description of the detailed apparatus and operations as set forth below describing in detail the mechanism and operations of the device as shown in the drawings.

Considering first the mechanism utilized in producing container-length tubes from continuous tubing and referring particularly to Figures 1–4 of the drawings, the continuous length of tubing T as taken from the extruding machine (not shown) in a continuously extruded length and in its final self-sustaining condition is drawn by rollers 1 (Figure 1) through the guide or bridge 2 (Figures 3 and 12) mounted on base B. The guide or bridge 2 may consist of vertical side members 2a having cross pieces 2b and 2c, the latter serving as a ledge over which the tubing T is carried. Ears 2d on the side members 2a enable the guide or bridge 2 to be attached as by screws 2e to the base B. The continuous length of tubing is carried forward from the guide or bridge 2 through a chuck or vise 3 while the latter is in unlocked condtion (Figures 2, 3 and 19) and then through cutter block 4 past knockout arm 12 until it meets and engages contact arm 5, whereupon further movement brings the contact arm 5 into electrical contact with micro switch 6. The closing of switch 6 closes a circuit which energizes solenoid 7 which then locks the vise or chuck 3. The vise or chuck 3 (Figure 19) is carried on a support 3a and consists of a lower stationary jaw 3b and an upper reciprocating jaw 3c mounted on guides 3d. Each jaw is provided with a shaped face 3e conforming with the shape of the continuous tubing being manipulated, in this case oval tubing, so that each jaw is provided with a semi-oval face. A standard 3f mounted on the support 3a carries an actuating arm 3g pivoted at one of its ends as shown at 3s to the standard 3f. Near the opposite end of the actuating arm 3g, the armature 3h is mounted as at 3j and said armature 3h is drawn downwardly when the solenoid 7 is energized. A spring 3k mounted at the outer end 3i of the actuating arm 3g and attached at its other end to any support (not shown) is extended when the armature 3h is drawn downwardly by the solenoid 7 when the latter is energized and when the solenoid is de-energized the spring 3k under tension draws the actuating arm 3g back to its normal position. A link 3m is attached to the actuating arm 3g as at 3n directly over the movable upper jaw 3c of the vise or chuck 3, and the link 3m is attached at its lower end to such movable upper jaw member 3c. A spring 3p surrounds the link 3m and is seated at one end against the actuating arm 3g and at the other end against the movable upper jaw member 3c.

The contact arm 5 (Figures 3, 13 and 14) has an extension 5a pivotally mounted at 5b on the upright 5c carried on the support 5d, the latter being attached to the base B. A spring 5e is attached at the outer end of the extension 5a while the other end of the spring 5e is attached to the pin 5f carried on the uprights 5c.

The switch 6 includes a contact element 6a and on the outer end of the contact element 6a a spring contact element 6b is mounted, the outer end 6c of which engages against a projection on the lower end of the contact arm 5. A lower contact element 6d also carried on the upright 5c is adapted to contact with the spring contact element 6b when the latter is moved by contact arm 5. Electrical connections are made to the contact elements 6a and 6d as shown at 6e.

When the contact arm 5 closes the switch 6 in addition to energizing solenoid 7, it simultaneously energizes a second solenoid 8 (Figures 2, 2A). The solenoid 8 controls the shearing mechanism for cutting the tubing. The armature 8a (Figure 2) is pivotally connected to link 8b, the other end of the link 8b being pivotally connected to lever 8c at 8d. The other end of the lever 8c is pivotally mounted at 8e on the frame F. A spring 8f is attached at one end of the lever 8c and at the other end to the bracket 3r on the frame F. A link 8g pivotally mounted at 8h intermediate the ends of the lever 8c is pivotally connected at its other end 8k to the clutch operating lever 8i.

The lever 8i operates the clutch 9 (Figure 11) to engage the latter and transmit power from the flywheel W through the shaft 9a to the knife operating mechanism. A spring 9b mounted on bracket 9c carried on frame F forces disengagement of the clutch 9 to disengage the knife operating mechanism. The flywheel W is rotated by motor M (Figure 2) through belt M1, the motor being mounted on shelf M2 supported on the frame F.

The cutting or shearing mechanism includes the cutter block 4 (Figures 3, 17, 18) carried on a support 4a mounted on the base B. The cutter block is shown as composed of plates 4b having centrally aligned openings 4c of a contour corresponding with the cross-section of the tubing being sheared, the plates 4b, 4b, being separated from each other by bolts 4d and two spacers 4e, providing a space 4f within which the cutter blade 10 operates.

The shaft 9a (Figure 3) carries a cam 9b on which a link 9c is carried. On the other end of said link 9c, the knife chuck 9d is provided mounted on the link 9c by the bolt 9e. A slot 9f is provided in the lower end of the knife chuck 9d for reception of the knife 10 which may be as shown a flat blade having the knife edge 10a. A set screw 10b fixes the knife 10 in set position. Oppositely disposed keys 9k on chuck 9d cooperate with keyways 9m in the frame thus insuring constant true alignment of knife blade 10 with the space 4f in cutter block 4. (See Figure 10.) Operation of the shaft 9a thus causes reciprocation of the knife blade 10 to and out of the cutter space 4f in the cutter block 4 with each revolution of the flywheel W.

A second switch 50 (Figure 2) which is provided to eliminate the possibility of double cuts, operates as follows: the micro switch 50 is closed by a projection 50a on spring arm 50b. Said arm 50b made of any springy material, is pivotally attached as at 50c and flexes over a bar 50d. The outer end 50e of arm 50b abuts the bottom 9r of the knife chuck 9d and lies adjacent to the knife blade 10. The arm 50b will, therefore, be in constant abutment with the bottom 9r of chuck 9d being forced downwardly by the chuck and returning upwardly under its own spring action. When the blade 10 has accomplished a cut, the chuck 9d has descended and has forced the arm 50b into the position as indicated by dot-dash lines in Figure 2. Consequently, immediately after the cut has been made, the chuck 9d and arm 50b have assumed their extreme downward position during which period the projection 50a is removed from contact with switch 50 and said switch opens.

As seen in Figure 2A, the switch 50 is closed in accordance with the full-line position shown in Figure 2. However, when switch 50 is opened (as described above) it breaks the circuit shown in Figure 2A. If, by accident, a tube should jostle the switch 6 (see Figure 3), the utilization of a switch 50 in the manner described above will prevent a recurring stroke of the cutter.

After the desired length of tube has been cut or sheared by the knife 10, provision is made for forcibly removing the sheared-off length of tubing in order to release the contact arm 5 and open the switch 6. The knockout arm 12 is provided for this purpose. It is operated by an eccentric 11 mounted on the outer end of shaft 9a, the eccentric 11 carrying a pin 11a (Figure 15). The knockout arm 12 is mounted on block 12a to which is also attached arms 12b, 12b extending angularly with respect to knockout arm 12 and providing a space between the arms 12b within which the eccentric pin 11a moves, so that movement of the eccentric 11 in a counterclockwise direction will trip the knockout arm 12 moving to the dotted position shown in Figure 15, whereupon the lower end of the knockout arm 12 will forcibly eject the sheared off portion of the tubing T between the cutter block 4 and the contact arm 5. Adjustment of the position of the knockout arm 12 is provided as shown in Figure 16 where the split ring members 12c and 12d carry extensions 12e and 12f respectively held together and about the shaft 9a by means of the bolt 12g, the arm 12f on the split ring 12d being attached to the block 12a. By this means, the bolt 12g may be loosened to fix, in the exact position desired, the knockout arm 12 with respect to the tubing being sheared in order to regulate the movement of the knockout arm 12.

As shown in Figure 4, when the sheared tubes are knocked out of position to release the contact arm 5, they may be thrown against a baffle cloth 13a which directs them onto the continuous belt conveyor 13 by which they are conveyed to the hopper 14. The continuous belt 13 and hopper 14 may be mounted on the frame 13b, the continuous belt conveyor 13 being driven by motor 13c and belt 13d. From the hopper 14 the sheared tubes are then fed to the mechanism for sealing an end or stopper in the tube as further described below.

Considering the mechanism as described up to this point, the continuous extruded tubing T is carried through the guide or bridge 2 through the vise 3 which is open at this time to permit the tubing to pass therethrough, then through the cutter block 4 past the knockout arm 12 until the end of the continuous tubing T contacts the contact arm 5. Further movement of the tubing T closes the switch 6 thus operating the solenoids 7 and 8 simultaneously. Operation of the solenoid 7 moves the armature 3h downwardly (Figure 19) and the movable vise member 3c to grip or lock the tubing in the device and prevent further movement of it at this time. At the same time that the tubing is thus locked against further movement, energizing of the solenoid 8 has taken place so that downward movement of the armature 8a (Figure 2) engages the clutch 9 to operate the shearing mechanism so that the knife 10 is moved down into the cutting space in the cutter block 4 to shear off the length of tubing between the cutter block 4 and the contact arm 5. Immediately thereafter and synchronized therewith, the eccentric 11 is operated and its movement causes the eccentric pin 11a to trip the knockout arm 12 (Figure 15), the movement of the knockout arm 12 serving to knockout the sheared portion of the tubing. As soon as the sheared-off portion of the tubing has been knocked out of position, the switch 6 is opened thus de-energizing the solenoids 7 and 8. The vise 3 immediately opens permitting the continuous tubing T to advance again while de-energization of the solenoid 8 takes place at the time when the knife 10 has returned to its inoperative position. The tubing T then advances until it contacts the contact arm and the operations are repeated. In this way the desired lengths of container tubes are automatically severed from continuous extruded tubing and made ready for the end sealing operation. The support 5d which carries the contact arm 5 and switch 6, and is mounted on base B, may be made adjustably mounted so that it may be moved to shorten or increase the distance of such contact arm 5 from cutter block 4 in order to control the length of tube which is sheared in order to provide for containers of any desired length.

Means are provided for carrying the sheared tubes 20 from hopper 14 to the sealing or end closing station in a directed and controlled manner. In the mechanism shown for this purpose two sheared tubes are sealed simultaneously in the sealing mechanism and thus provided with end closures simultaneously and for this purpose two sheared tubes are delivered from the hopper 14 to the end closing mechanism as follows. The sheared tubes are delivered from the hopper 14 by hand or automatically if desired, onto conveyor belt 15 carried on gears 15a and 15b (Figure 5). The conveyor belt 15 is partitioned by means of cleats 15c into cells loosely accommodating individual sheared tubes. This is done to maintain a certain spaced relationship between tubes corresponding to the spaced relationship of two faces on a pick-off roller hereinafter described. Conveyor belt 15 is given a step by step movement to advance two tubes into tube delivering position. For this purpose ratchet 16 (Figure 20) is engaged with gear 17 movement of which causes movement of pulley wheel 15b for a distance sufficient to move two sheared tubes under the tube delivering mechanism. Ratchet 16 is pivotally mounted at 16a on the lever 18, one end 18b of which is pivotally mounted on the shaft carrying gear 17 and belt pulley 15b while the other end of lever 18 is pivotally mounted at 18c on the end of the operating arm 19. A spring 16b attached at the outer end 16c of the ratchet 16 has the other end of the spring attached to the lever 18 at 16d in order to maintain the ratchet 16 in engaging position with the teeth of the gear 17. Referring to Figure 20, it will be seen that upward movement of the actuating arm 19 will operate the ratchet 16 to rotate gear 17 and belt pulley 15b the desired distance. To prevent movement of the gear 17 and belt pulley 15b when the ratchet 16 is returning to its normal position, a pawl 17a pivotally mounted at 17b on standard 17c is spring pressed by spring 17d into latching position. Pawl 17a prevents clockwise movement of gear 17 but permits counterclockwise movement of that gear.

The sheared tubes are removed from the belt conveyor 15 by roller 21 desirably of rubber. (See Figures 5, 6, 21, 22, 48.) The roller 21 constantly revolves on shaft 21a carried on cradle 21b being driven by belt 21c passing over pulley 21d and 21e. Constantly revolving roller 21 is reciprocated to and away from belt conveyor 15 at timed intervals and when reciprocated toward the belt 15 actually engages the sheared tubes on the conveyor 15 to remove two tubes therefrom. Reciprocation is obtained in the following manner. The roller 21 carried on shaft 21a mounted on the cradle 21b has the cradle 21b mounted at one end on blocks 21f carried on shaft 21g which also carries the pulley 21e. The other end of the cradle has the cross piece 21h to which is pivotally attached arm 21k. Movement of the arm 21k down and up will cause the roller 21 to move toward and away from respectively the conveyor belt 15.

The roller 21 has two tube engaging faces 21m, 21m, spaced apart a distance equal to the position of two tubes on the conveyor belt 15 so that when the roller 21 is reciprocated into contact with the tubes on the conveyor belt 15, rotation of the roller 21 will remove two tubes from the conveyor belt 15 and propel the tubes thus removed from the conveyor belt 15 onto moving belt 23. Belt 23 moves over pulleys 23a, 23a, and geared pulley 23b, an adjustment pulley 23c being provided. As shown in Figure 21, belt 23 moves in a clockwise manner carrying the two sheared tubes delivered thereon by roller 21 toward belt 24. In order to insure alignment of the tubes as delivered to belt 23, partitions 23d (Figure 48) are provided. Where two tubes are being delivered simultaneously, three such partitions 23d are provided supplying channels 23e, one for each sheared tube so that the sheared tubes are carried along by belt 23 between partitions 23d and maintained in their properly aligned position.

The belt 23 carries such sheared tubes forwardly into contact with vertical moving belt 24 (Figures 21, 48). The belt 24 moves in a counterclockwise manner on pulley 24a and geared pulley 24b, the latter being geared to pulley 23b. In this way belts 23 and 24 move at the same speed and travel contiguously to each other as shown at 24c. The sheared tubes carried forward by belt 23 are moved into contact with vertically moving belt 24 and are turned through an angle of approximately 90° and moved vertically downward between the contiguous portions of the belts 23 and 24. In order to insure proper alignment of the sheared tubes when carried downwardly between the contiguous portions of the belts 23 and 24, partitions 24d are provided and carried down between the belts 23 and 24 supplying channels 24e within which the sheared tubes move downwardly and are maintained in proper alignment.

Briefly describing the operation of the mechanism which delivers the sheared tubes from the hopper 14 to the end sealing stations, the sheared tubes are fed from hopper 14 onto belt conveyor 15 as by hand and carried forward by the belt conveyor 15 to a position below the rubber roller 21. At timed intervals while the belt 15 is carrying the sheared tubes below roller 21, the latter is reciprocated down into contact with the sheared tubes on belt conveyor 15 and delivers two sheared tubes from the belt 15 onto the belt 23. The belt 23 carries the tubes into contact with vertical belt 24 and moves the tubes into vertical position so that they are carried between contiguous portions of belts 23 and 24 downwardly in aligned position and delivered (Figure 21) to an open chuck 25 of the closure sealing mechanism to be described below. The means for supplying power to the several belts and other operating elements and for timing and correlating the movements of the several parts will be described below.

The mechanism for applying a closure to an end of the tube and sealing it in its position involves a sequential operation in which the tube or pair of tubes are automatically conveyed through a series of successive stations as follows: at the first station the tubes are positioned in an open chuck in which they are locked and then carried to a second station where a thin layer of solvent for the plastic employed in making the tubes is applied to the end of each tube; the chuck carrying the tubes the ends of which have been wet with solvent, is then automatically moved to the next station at which a closure or sealing cap is punched automatically from sheet material and pushed into position in each tube where they are held lightly in position both by the natural "spring" of the plastic due to the special shape of the stamping and also by the action of the very thin layer of solvent cement on the end or rim of the tube; the tubes are then carried to the next succeeding station where the closures or caps are pushed into exact position in line with the end of the tube in which they are being placed at the same time that the solvent which has been applied to the closures or caps before insertion is drawn by capillary action into the inside of the tube between the rim of the closure or cap and the end of the tube; the closures or caps thus having been placed in position, the tubes are moved to the next station where they are subjected to drying by a blast of hot air blown against the bottom of the tubes to remove surface solvent; and they then move to the final station where the chuck is automatically opened, and the tubes drop therefrom down the chute to a conveyor.

Referring more particularly to the mechanism utilized for carrying out this series of operations, the two tubes 20 delivered by the belts 23 and 24 (Figure 6) are pushed into the chuck 25 which is open at this time and the sheared tubes 20 are inserted into the chuck by the belts, dropping the last inch by gravity. Base plate 28c (Figure 50) fixes the position of the tubes in respect to the bottom of the tube holders. There are a series of six chucks 25 mounted at six equidistant points at the periphery of the top plate 28 (Figure 24). The chucks are all identical. Each chuck consists of a stationary front plate 25a and a movable back plate 25b, the plates being provided with recesses 25c conforming to the cross-sectional contour of the sheared tubes. Springs 25d normally press the movable back plate 25b toward the stationary front plate 25a to lock sheared tubes in position in the recesses. To open the chuck for reception of the tubes, the movable back plate 25b is provided with an arm 25e extending rearwardly thereof and having pins 25f thereon which receive the end 25g of the bell crank 26. The bell crank is pivotally mounted at 26a and has an arm 26b extending rearwardly and angularly from the chuck 25 into contact with a stationary boss plate 27. A roller 26c at the end of the arm 26b of the bell crank 26 engages against the edge of the stationary boss plate 27, the latter being mounted above the top plate 28. As shown in Figure 24, when the roller 26c of the bell crank 26 rides along the arcuate edge 27a of the stationary boss plate 27, the bell crank forces the arm 25e on the movable back plate 25b rearwardly to open the chuck to permit reception of sheared tubes fed by the belts 23 and 24 into the chuck. As soon as the roller 26c on the bell crank 26 clears the stationary boss plate, the springs 25d force the movable back plate 25b into closing position to lock the sheared tubes in the chuck 25. Each chuck as it passes station 1 thus receives sheared tubes to be carried through the successive closure and sealing operations.

From station 1, the sheared tubes locked in position in the chuck 25 move to station 2, at which station the lower ends of the tubes have a layer of suitable solvent cement such as acetone applied to them. The solvent cement which is liquid is applied to the bottoms of the tubes by the mechanism shown in Figures 26 and 27. The sheared tubes 20 in chuck 25 are positioned over fingers 29a, there being one such finger 29a for each tube. The fingers 29a are spaced apart and attached, as by screws, to a cross-plate 29m. Said cross-plate 29m is attached on a rod 29b thereby forming a two-fingered fork-like unit. The fingers 29a cooperate in a loose relationship with two holes formed in a cap 29n, said cap 29n sealing the upper end of the chamber 29f. A coil spring 29c is lodged in the space between the fingers 29a and abuts the inner edges of cap 29n and plate 29m as best shown in Figure 27.

The solvent cement is supplied from a container 29d, a pump 29 forcing the solvent from the container 29d through the flexible tubes 29e to the upper surface of the finger 29a where a thin layer of such solvent is deposited on the finger 29a. A tubular chamber 29f encloses the finger 29a and rod 29b and into such chamber 29f, via the holes in cap 29n, any excess solvent may run to be carried back through the flexible pipe 29g to container 29d. The fingers 29a are moved into contact with their respective sheared tubes 20 by the eccentric 29h which also operates the pump 29. Motion is transmitted to the eccentric 29h through the shaft 29k. The pump 29 and associated parts as shown in Figures 26 and 27 are mounted below the chuck 25 at station 2 as more particularly shown in Figure 7.

When chuck 25 comes to rest at station 2, movement is imparted through shaft 29k to eccentric 29h so that the rod 29b moves upwardly to force the fingers 29a into contact with the bottoms of the sheared tubes 20 thus depositing a thin layer of the solvent from the fingers 29a on the bottom of each of the tubes 20. The finger and rod unit are constantly spring-urged downwardly and tend to assume a position in relation to the movement of cam 29h.

The chuck 25 is then automaticaly moved to the closure station or third station. At this station, the closures or caps for the ends of the tubes are automatically formed and inserted into position while the tubes are at this station. For this purpose a roll 30 of plastic tape 31 (see Figure 8) is carried under roller 31k through heater 32 where it is preheated and then through a stamping and forming die. (Figures 28–33.) The preheated plastic tape 31 is fed into the stamping and forming die 33 passing through a passage 33a between upper and lower die members 33b and 33c having aligned openings 33d and 33e respectively. Each tube 20 is positioned at this station over the opening 33d in the upper die member 33b. The punch 33f, one for each tube 20, is mounted for reciprocation within the guide chamber 33g and is given reciprocation through the eccentric 33h mounted within a plate 33i on shaft 33k (see Figure 35). The plunger 33m carries the punches 33f at its upper end and is connected by arm 33n to the eccentric 33h by connecting rod 33j. The plunger 33m reciprocates in the guide chamber 33g being provided with keys 33p which move within keyways 33r formed in the walls of the guide chamber 33g. The movement of the punch 33f as shown in Figures 28 and 29 is sufficient not only to punch out the cap 33s from the tape 31 but to carry it upwardly through the opening 33d in the upper die member 33b into the bottom end of the tube 20 where it is held in position by the spring action of the plastic material of which the cap 33s is formed. The solvent present on the lower end of tube 20 acts as a lubricant and permits the cap-shaped cap to be pushed in without undue force.

Desirably the cap is given a cross-sectional contour as shown at 33s for which purpose the lower end of the opening 33d in the upper die member 33b is countersunk or cutaway at 33t in order that a peripheral flange 33u may be formed on the cap 33s. Such peripheral flange 33u on the cap 33s enables the cap 33s to be placed in the end of the tube 20 and to adjust itself in position regardless of the slight variations which take place in the cross-sectional contour of the tube 20 or in the cap size itself.

Provision may be made to blow air across the die member 33b in the event that a cap 33s is not properly placed in a tube 20 or no tube 20 happens to be in the chuck. Such blast of air is delivered from pipe 33z. Each time that the punches come up and punch out a cap 33s, a squirt of air under pressure is delivered across the face of die member 33b. The air delivery is controlled by cam 33v (Figure 34) which operates the spring-pressed finger 33w that presses the pipe 33z against bracket 33x to cut off air. Movement of the cam 33v removes the pressure of the finger 33w against the pipe 33z to permit air to pass through the pipe 33z. If for any reason the cap 33s does not hold within a tube 20, or if no tube 20 is in the chuck, the jet of air blows such cap down the chute 33y to a waste box.

The cap forming and closure inserting mechanism is placed at station 3 below chuck 25 (Figure 24). The tape 31 from which the caps or closures 33s have been stamped passes over roller 31a (Figure 39) and between that roller 31a and the spring pressed roller 31b cooperating therewith, the spring 31s holding the roller 31b in frictional contact with the roller 31a so that movement of the roller 31a, clockwise, draws the plastic tape 31 from the roll 30 through the die 33. The movement of the roller 31a and correspondingly of the tape 31 through the die 33 is controlled by a gear 31c (Figure 39) rigidly mounted on the shaft 31d to the roller 31a, the gear 31c being given the necessary movement by the ratchet 31e pivotally mounted on the arm 31f, the arm 31f being pivotally mounted at 31g to one end of the bell crank 31h. The movement of the roller 31a carrying the tape 31 through the die 33 is coordinated with the movement of the top plate 28 and chuck 25 carried thereon as more particularly described below.

From station 3, the tubes 20 now carrying the caps or closures 33s therein are moved to station 4 where the ends of the tubes and caps therein are wetted by a layer of solvent cement such as acetone and methyl-cellosolve 50:50, by mechanism substantially the same as that employed at station 2 where the ends of the tubes 20 were first wetted with solvent. Such solvent cement at station 4 is applied from fingers like 29a at station 2, which fingers are also movable upwardly in the same manner as described in connection with the fingers 29a in order to exert pressure against the sealed tubes 20. The springs employed with the fingers at this station may be more powerful than those used in connection with fingers 29a at station 2 in order that sufficient pressure may be exerted to push the caps or closures 33s into exact position in line with the cut off ends of the tubes 20 so that there is no overlapping. At the same time that such action is taking place, the layer of solvent cement about 0.10 inch in depth on the fingers at station 4 is drawn by capillary action into the inside of the tube between the tube and the peripheral flange 33u on the caps or closures 33s. This gives a comparatively large volume of solvent on the inside of the tube with practically no solvent on the outside so that there is no marring of the external surface of the tubes 20.

Further clockwise movement of the top plate 28 brings the chuck 25 carrying tubes 20 with cemented and positioned closures 33s therein to station 5 where they are subjected to a preliminary drying operation. A blast of hot air is blown against the bottom of the tubes 20 for this purpose to remove surface solvent. (Figure 25.) For this purpose air is blown by fan 34a driven by motor 34b through conduit 34c where it is heated by the heater 34d and passes through the upper end of the conduit 34c about the tubes 20 to effect the preliminary drying.

From station 5 by further movement of the top plate 28, the chuck containing the capped or closure carrying tubes 20 passes to station 6 (Figure 24). At this station, the bell crank 26b has again come into contact with the boss plate 27 whereupon the chuck is opened and the capped or sealed tubes 20 drop out of the chuck into chute 35 (Figure 50) down which they are conveyed to the conveyor 36 which carries them through a heating and drying chamber 36a containing electric light bulbs 36b for heating purposes and through which hot air may be blower circulated so that the tubes when carried out of the drying chamber 36a by the conveyor 36 are capped and sealed at one end and may be removed from the conveyor 36 for storage or packing at platform 36c. The conveyor 36 is motor driven by motor 36d (Figure 9) and belts 36e.

Figures 7, 36:
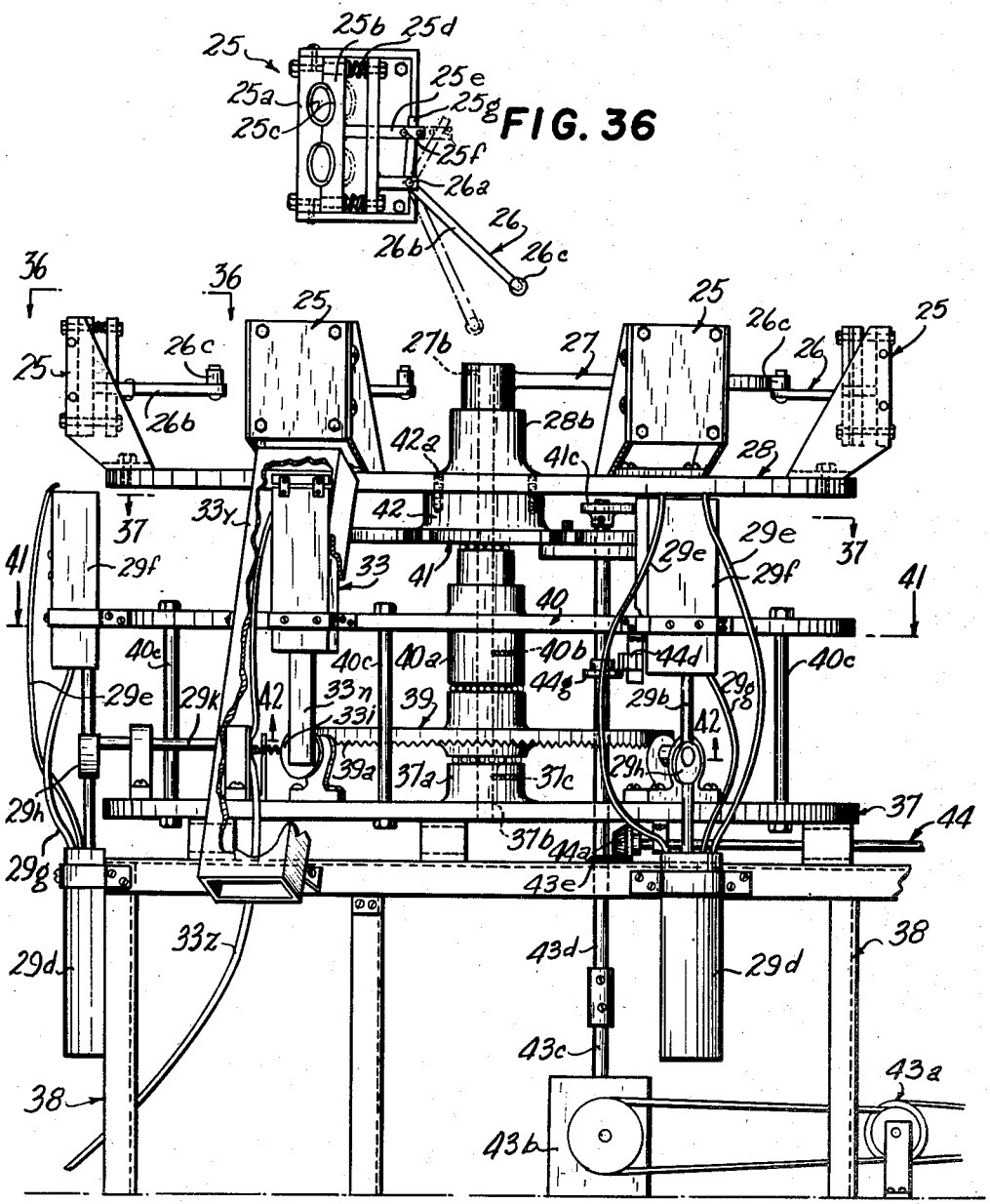
Figure 7 is a side elevation on line 7—7 of Figure 1 showing the sealing and related mechanisms.
Figure 36 is a detail of the chuck for holding the tubes when they are carried through the various sealing operations at the several stations in the sealing mechanism.
Figure 50:
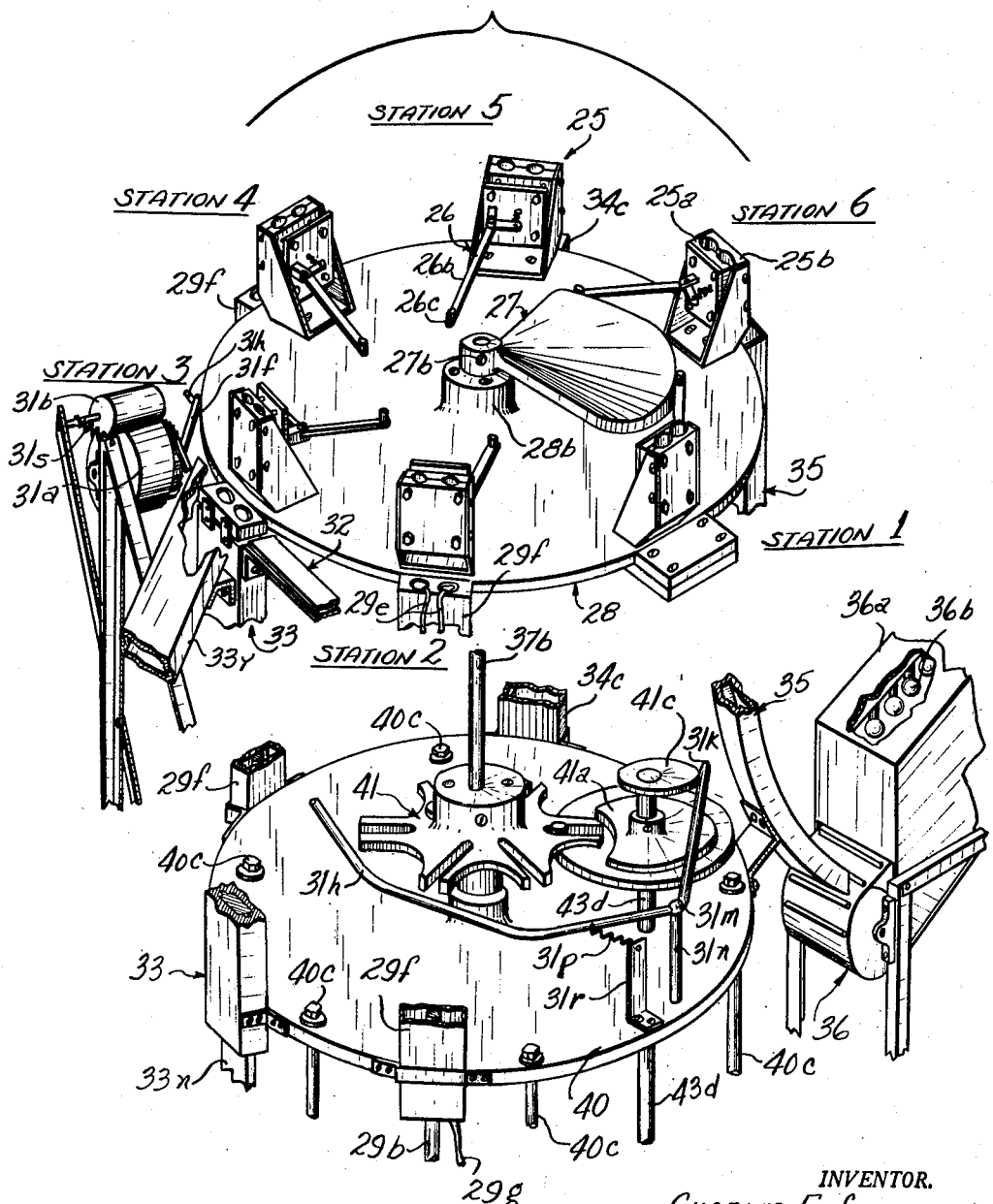
Figure 50 is an exploded view of portions of the sealing mechanism showing the chucks which carry the tubes through the several stations and the means for transmitting power to such stations as well as for correlating the movement of the sealing mechanism with the tape feeding mechanism for producing the closures.

Considering the manner of mounting the closure applying and sealing means, and referring particularly to Figures 7, 50 and 51, a base plate 37 is mounted on frame 38. The plate 37 carries a boss 37a in which a vertical shaft 37b is mounted, the boss 37a being keyed as shown at 37c to the shaft 37b so that there is no movement between the shaft and the plate 37, the latter also being stationary. A circular plate 39 having ring gear 39a is mounted for rotation on shaft 37b for purposes hereinafter set forth. An intermediate stationary plate 40 having boss 40a is mounted on the shaft 37b above the circular plate 39, the plate 40 and boss 40a being keyed as at 40b to the shaft 37b. Plate 40 is further supported by standards 40c on base plate 37. The intermediate stationary plate 40 carries the pump and associated mechanism for applying solvent to the ends of the tubes at station 2, the cap cutting and insertion dies and punches at station 3; the solvent applicators and pressure operated fingers at station 4; the heater and blower at station 5; and the chute 35 at station 6, these various mechanisms being attached rigidly to the periphery of the stationary plate 40 at the appropriate points below the particular chucks when at the stations as indicated.

Above the intermediate stationary plate 40, a Geneva gear 41 is mounted on shaft 37b for rotation thereon, the gear 41 carrying a boss 42 to which the revolving top plate 28 also mounted for rotation on shaft 37b, is directly bolted as by bolts 42a so that the Geneva gear 41 and movable top plate 28 move together as a unit on shaft 37b. Above the boss 28b of the plate 28, the stationary boss plate 27 is mounted on the shaft 37b and keyed thereto as at 27b.

The step by step movement of the movable top plate 28 is obtained by the Geneva gear 41 (Figure 50) operated by the Geneva pinion 41a rotating on shaft 43d. The Geneva gear is provided to produce a complete revolution of plate 28 in six stepwise movements. On shaft 43d which operates the Geneva pinion, a cam 41c is mounted through which the necessary movement of the bell crank 31h is obtained to correlate the feeding of the plastic tape 31 through the die 33 with the movement of the movable top plate 28 carrying the chucks through their several stations. Thus the cam 41c transmits motion to the end 31k of the bell crank 31h (Figures 37–39) and the movement of the cam 41c will transmit the necessary motion to the bell crank 31h. Bell crank 31h is pivoted at 31m on rod 31n carried on plate 40, the end 31h of the bell crank serving by its movement to advance gear 31c and roller 31a as described (Figure 39). A spring 31p attached to the bell crank 31h and bracket 31r mounted on plate 40 holds the bell crank in spring pressed position. By this arrangement each stepwise movement of plate 28 caused by the Geneva gear 41 will produce a corresponding correlated movement of the plastic tape 31 through the die 33.

The power for operating the entire mechanism for conveying the sheared tubes 20 to the sealing station and the several operations in the sealing mechanism, is all obtained from motor 43 (Figures 6, 7, 51). Referring more particularly to Figures 6 and 51, motor 43 transmits power to the variable speed control 43a and from the latter to the speed reducer 43b from which it is transmitted to shaft 43c, the latter being coupled to the drive shaft 43d having a bevel gear 43e which meshes with bevel gear 44a on shaft 44. Sprocket 44b idles on shaft 44 until connected by clutch 44c to shaft 44. Clutch 44c is activated as follows. A plate 44g keyed to shaft 43d, carries pin 44e which revolves with the shaft 43d. Pin 44e at a portion of its revolution (Figure 52) operates to close switch 44d mounted on bracket 44f carried on base plate 37. The closing of switch 44d operates solenoid 44h which actuates armature 44i to move the clutch 44c. A spring 44k restores the clutch to inoperative position when the switch 44d is opened. The closure of switch 44d and engagement of clutch 44c permits one revolution of sprocket 44b at which time the switch is opened and the clutch disengaged. During the engagement of the clutch 44c, and revolution of sprocket 44b, the latter drives shaft 45 by means of sprocket 45a carried thereon and chain 45b cooperating with the sprockets 44b and 45a. The end of shaft 45 is provided with a miter gear 45c which meshes with ring gear 39a on circular plate 39 (see Figures 41 through 44). The ring gear 39a drives three shafts: first, shaft 29k which operates the eccentric 29h for the pump at station 2; second, shaft 33t which supplies the power to operate the punch at station 3; and third, shaft 29k which operates the eccentric 29h of the pump at station 4.

At the upper end of shaft 43d is mounted the Geneva pinion which operates the Geneva movement that gives the stepwise advancement of movable top plate 28. In this way the operations at the several stations are coordinated with the advancement of the chucks 25 and also coordinated with the cap punching and sealing operations.

Shaft 44 carries a second sprocket 44m cooperating with sprocket 46a on shaft 46 to drive the latter and rotate bevel gears 46b which in turn drive belt 47 (Figure 51). Belt 47 (see Figure 48) rotates geared pulley 23b thus controlling and causing movement of belt 23 and through the meshing of geared pulley 23b with geared pulley 24b producing the cooperating movement of belt 24. The upper pulley over which belt 24 moves, is provided with a belt 21c (Figure 6) which rotates roller 21. At the end of shaft 46 a crank 46c (Figure 51) is provided to cause the up and down motion of operating arm 19 which produces the motion for moving conveyor 15 (Figure 48) as explained above. Further, arm 21k (Figure 51) is pivoted at 21n to arm 21p, the other end of which 21r is pivotally mounted on the main frame and contacts cam 46d on shaft 46 to produce the up and down action of the arm 21k and corresponding movement of the cradle 21b (Figure 48) which moves the roller 21 toward and away from the conveyor 15 to discharge sheared tubes 20 therefrom as explained above, thus producing the necessary timed relation in the movement of these various parts.

The correlation of movement of the various mechanisms will be apparent from what has been set forth above but may be briefly explained as follows. The sheared tubes are cut from the continuous tubing by automatic operation and delivered to the conveyor belt 15 from which they are fed periodically by roller 21 to belt 23, the conveyor 15 being operated by a ratchet system in which its movement is synchronized with the movement of the revolving plate 28 of the sealing machine. The sheared tubes thus delivered to belt 23 are automatically transferred and upended by belt 24 and delivered into the chucks 25 as the chucks come successively to station 1 on the revolving top plate 28. Each chuck then passes through the stations 2 to 6 successively on the revolving plate 28 where at station 2 the ends of the tubes are provided with a solvent cement, at station 3 caps or closures are punched from plastic tape and positioned in the solvent treated ends of the tubes 20 after which they pass to station 4 where the closures or caps are again subjected to treatment with solvent between the tube ends and the flanges of the caps and the caps or closures are seated in final position. From this station they then go to the preliminary drying station 5 and ultimately to station 6 where they are released from the chuck and deposited in the chute 35.

The operations through the stations are all automatically correlated each chuck receiving the tubes at station 1 in succession and following through the several stations and treatments until the finished sealed tubes are released at station 6. The application of solvent at station 2, the feeding of the plastic tape and punching of caps at station 3, the further application of solvent cement at station 4 are all correlated with the various operations by the mechanisms set forth above.

Having thus set forth my invention, I claim:

1. In a machine for adhesively securing caps to the ends of tubes having a horizontally mounted and intermittently rotatable turntable with tube holders perpendicularly mounted thereon for the reception of said tubes being fed thereto, said turntable adapted to be intermittently rotated by a suitable mechanism; in combination with means for fixing the position of the bottom of said tubes in respect to the bottom of said tube holders, and means including a trigger mechanism actuated by a stationary cam plate for holding and releasing said tubes from said holders.

2. In a machine for adhesively securing caps to the ends of tubes having a longitudinally mounted and intermittently rotatable circular turntable with equally spaced tube holders perpendicularly mounted thereon for the reception of said tubes being fed thereto; said turntable adapted to be intermittently rotated by a suitable mechanism; in combination with means for fixing the position of the bottom of said tubes in respect to the bottom of said tube holders, and means including a trigger mechanism actuated by a spring and a stationary cam plate for holding said tubes in said holders and releasing said tubes from said holders.

3. In a machine for adhesively securing caps to the ends of tubes having a longitudinally mounted and intermittently rotatable circular turntable with tube holders perpendicularly mounted and equally spaced thereon for the reception of said tubes being fed thereto; said turntable adapted to be intermittently rotated by a suitable mechanism; in combination with means for fixing the position of the bottom of said tubes when said tubes are fed into said holders in respect to the bottom of said holders, and means including an arcuate plate and spring trigger mechanism actuated by a stationary cam plate for holding said tubes within said holders and releasing said tube from said holders.

4. In a machine for adhesively securing caps to the ends of tubes having a longitudinally mounted and intermittently rotatable turntable with tube holders perpendicularly mounted thereon for the reception of said tubes being fed thereto, said turntable adapted to be intermittently rotated by a suitable mechanism; in combination with means for ejecting the capped tubes from the machine including a trigger mechanism actuated by a stationary cam and spring for releasing said tubes from said holders so that the tubes may drop out of the holders by gravity.

5. In a machine for adhesively securing caps to the ends of tubes having a horizontally mounted and intermittently rotatable turntable with tube holders perpendicularly mounted thereon for the reception of said tubes being fed thereto, said turntable adapted to be intermittently rotated by a suitable mechanism; in combination with means for fixing the position of the bottom of said tubes in respect to the bottom of said tube holders, and means externally of said tubes for holding and releasing said tubes from said holders.

6. In a machine for adhesively securing caps to the ends of tubes having a longitudinally mounted and intermittently rotatable circular turntable with equally spaced tube holders perpendicularly mounted thereon for the reception of said tubes being fed thereto; said turntable adapted to be intermittently rotated by a suitable mechanism; in combination with means comprising a base plate for fixing the position of the bottom of said tubes in respect to the bottom of said tube holders, and means including a trigger mechanism actuated by a stationary cam plate for holding said tubes in said holders and releasing said tubes from said holders.

7. In a machine for adhesively securing caps to the ends of tubes having a longitudinally mounted and intermittently rotatable circular turntable with holders perpendicularly mounted and equally spaced thereon for the reception of said tubes being fed thereto; said turntable adapted to be intermittently rotated by a suitable mechanism; in combination with means comprising a base plate for fixing the position of the bottom of said tubes when said tubes are fed into said holders in respect to the bottom of said holders, and means including an arcuate plate and trigger mechanism actuated by a cam plate for holding said tubes within said holders and releasing said tubes from said holders.

8. In a machine for adhesively securing caps to the ends of tubes having a longitudinally mounted and intermittently rotatable turntable with tube holders perpendicularly mounted thereon for the reception of said tubes being fed thereto said turntable adapted to be intermittently rotated by a suitable mechanism; in combination with means for ejecting the capped tubes from the machine including, mechanism externally of the tubes for releasing said tubes from said holders so that the tubes may drop out of the holders by gravity.

9. Apparatus as set forth in claim 1 including means for inserting a closure within each tube, and means for cementing the closure within the tube while said tube is held in the tube holder.

10. Apparatus as set forth in claim 9 including means for directing a blast of air at each tube and closure to remove a closure not held in the tube.

11. Apparatus as set forth in claim 5 including means for inserting a closure within each tube, and means for cementing the closure within the tube while said tube is held in the tube holder.

12. Apparatus as set forth in claim 5 including means for directing a blast of air at each tube and closure to remove a closure not held in the tube.

CHARLES E. SLAUGHTER.

References Cited in the file of this patent

UNITED STATES PATENTS

| Number | Name | Date |
|---|---|---|
| 1,309,179 | Bossert | July 8, 1919 |
| 1,370,800 | Egerton | Mar. 8, 1921 |
| 1,510,243 | Perry | Sept. 30, 1924 |
| 1,608,617 | Reifsnyder | Nov. 30, 1926 |
| 1,942,383 | Dickhaut | Jan. 2, 1934 |
| 1,970,755 | Knoll | Aug. 21, 1934 |
| 2,181,214 | Stone | Nov. 28, 1939 |
| 2,209,412 | Lupo | July 30, 1940 |
| 2,230,410 | Parkhurst | Feb. 4, 1941 |
| 2,372,385 | Mandell | Mar. 27, 1945 |
| 2,383,230 | Voke | Aug. 21, 1945 |
| 2,390,171 | Ratay | Dec. 4, 1945 |
| 2,390,863 | Amidon | Dec. 11, 1945 |
| 2,393,347 | Stuart | Jan. 22, 1946 |
| 2,423,965 | Coyle | July 15, 1947 |
| 2,483,028 | Waldinger | Sept. 27, 1949 |

OTHER REFERENCES

"Hackh's Chemical Dictionary," third edition.